US012548496B2

(12) United States Patent
No et al.

(10) Patent No.: US 12,548,496 B2
(45) Date of Patent: *Feb. 10, 2026

(54) GATE SIGNAL MASKING CIRCUIT, GATE DRIVER INCLUDING THE SAME AND DISPLAY APPARATUS INCLUDING THE SAME

(71) Applicant: Samsung Display Co., LTD., Yongin-si (KR)

(72) Inventors: Sang Yong No, Yongin-si (KR); Kyungho Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,564

(22) Filed: Mar. 19, 2024

(65) Prior Publication Data

US 2025/0006108 A1 Jan. 2, 2025

(30) Foreign Application Priority Data

Jun. 27, 2023 (KR) ........................ 10-2023-0082718

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/08* (2013.01); *G09G 2320/0247* (2013.01); *G09G 2330/021* (2013.01)

(58) Field of Classification Search
CPC ......... G09G 3/30-3291; G09G 3/3674; G09G 3/3677
See application file for complete search history.

(56) References Cited

U.S. PATENT DOCUMENTS 11,423,843 B2 8/2022 Kim et al.
2021/0407427 A1* 12/2021 Lee ...................... G09G 3/3266
2021/0407429 A1* 12/2021 Seo ...................... G09G 3/3233

FOREIGN PATENT DOCUMENTS

KR 101908513 B1 10/2018
KR 101983764 B1 5/2019
KR 1020220000022 A 1/2022
KR 1020220000023 A 1/2022

* cited by examiner

*Primary Examiner* — Roy P Rabindranath

(74) *Attorney, Agent, or Firm* — CANTOR COLBURN LLP

(57) ABSTRACT

A gate signal masking circuit includes: a connection transistor connecting a first control node and a first transistor based on a connection signal; the first transistor connected to a masking node, the connection transistor and a second control node; a second transistor including a control electrode receiving a carry signal, a first electrode receiving a masking signal and a second electrode connected to a first node; a third transistor including a control electrode receiving an enable signal, a first electrode connected to the first node and a second electrode connected to the masking node; a fourth transistor including a control electrode receiving a second enable signal, a first electrode connected to the masking node and a second electrode connected to a second node; a fifth transistor including a control electrode receiving the carry signal, a first electrode connected to the second node and a second electrode receiving a power voltage.

22 Claims, 17 Drawing Sheets

GATE SIGNAL MASKING CIRCUIT, GATE DRIVER INCLUDING THE SAME AND DISPLAY APPARATUS INCLUDING THE SAME

This application claims priority to Korean Patent Application No. 10-2023-0082718, filed on Jun. 27, 2023 and all the benefits accruing therefrom under 35 U.S.C. § 119, the content of which in its entirety is herein incorporated by reference.

BACKGROUND

1. Field

Embodiments of the present invention relate to a gate signal masking circuit, a gate driver including the gate signal masking circuit and a display apparatus including the gate driver. More particularly, embodiments of the present invention relate to a gate signal masking circuit reducing a power consumption, a gate driver including the gate signal masking circuit and a display apparatus including the gate driver.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

When an image displayed on the display panel is a static image or the display panel is operated in always on mode, a driving frequency of the display panel may be decreased to reduce a power consumption.

When a portion of the image displayed on the display panel is a static image and a portion of the image displayed on the display panel is a moving image, it is necessary to reduce a driving frequency of the portion of the display panel corresponding to the static image to further reduce the power consumption.

However, a stage of the gate driver receives an output of a previous stage as a carry signal to output the gate signal so that the driving frequency of only a portion of the display panel may not be decreased.

In addition, when a first gate signal generator for generating a data initialization gate signal and a second gate signal generator for generating a compensation gate signal are formed in common, waveforms of the data initialization gate signal and the compensation gate signal may not be generated differently.

SUMMARY

Embodiments of the present invention provide a gate signal masking circuit supporting a multiple division of a driving frequency to reduce a power consumption of the display apparatus and capable of differently generating waveforms of a data initialization gate signal and a compensation gate signal.

Embodiments of the present invention also provide a gate driver including the gate signal masking circuit.

Embodiments of the present invention also provide a display apparatus including the gate driver.

In an embodiment of a gate signal masking circuit according to the present invention, the gate signal masking circuit includes: a connection control switching element, a first switching element, a second switching element, a third switching element, a fourth switching element and a fifth switching element. The connection control switching element is configured to connect a first control node and the first switching element based on a connection control signal. The first switching element includes a control electrode connected to a masking control node, a first electrode connected to the connection control switching element and a second electrode connected to a second control node. The second switching element includes a control electrode configured to receive a carry signal, a first electrode configured to receive a masking power signal and a second electrode connected to a first intermediate node. The third switching element includes a control electrode configured to receive a first enable signal, a first electrode connected to the first intermediate node and a second electrode connected to the masking control node. The fourth switching element includes a control electrode configured to receive a second enable signal, a first electrode connected to the masking control node and a second electrode connected to a second intermediate node. The fifth switching element includes a control electrode configured to receive the carry signal, a first electrode connected to the second intermediate node and a second electrode configured to receive a low power voltage.

In an embodiment, the gate signal masking circuit may further include a sixth switching element including a control electrode connected to the second control node, a first electrode configured to receive a first clock signal and a second electrode connected to a gate output node, a seventh switching element including a control electrode configured to receive the carry signal, a first electrode connected to the gate output node and a second electrode configured to receive the low power voltage and an eighth switching element including a control electrode configured to receive the carry signal, a first electrode configured to receive the first clock signal and a second electrode connected to the second control node.

In an embodiment, the gate signal masking circuit may further include a first masking capacitor including a first electrode configured to receive the first clock signal and a second electrode connected to the second control node and a second masking capacitor including a first electrode connected to the masking control node and a second electrode configured to receive the low power voltage.

In an embodiment, the masking power signal may be the first clock signal. The first electrode of the second switching element may be connected to the first electrode of the sixth switching element.

In an embodiment, when the first enable signal has an inactive level in all periods in which the carry signal has an active level, the gate signal masking circuit may be configured to output a gate pulse.

In an embodiment, when the first enable signal has an active level in all periods in which the carry signal has an active level, the gate signal masking circuit may be configured not to output a gate pulse.

In an embodiment, when the first enable signal is changed from an inactive level to an active level during a period in which the carry signal has an active level, the gate signal masking circuit may be configured to output a gate pulse.

In an embodiment, when the first enable signal is changed from an active level to an inactive level during a period in which the carry signal has an active level, the gate signal masking circuit may be configured not to output a gate pulse.

In an embodiment, the connection control signal may be one of previous carry signals. The connection control switching element may be a P-type transistor.

In an embodiment, the connection control signal may be an inverted signal of one of previous carry signals. The connection control switching element may be an N-type transistor.

In an embodiment of a gate driver according to the present invention, the gate driver includes: a carry generator, a first masking circuit and a second masking circuit. The carry generator is configured to generate a carry signal based on a previous carry signal. The first masking circuit is connected to the carry generator and configured to output a first gate signal. The second masking circuit is connected to the carry generator and configured to output a second gate signal. The first masking circuit includes a connection control switching element connecting a first control node of the carry generator and a first switching element of the first masking circuit.

In an embodiment, the first control node of the carry generator may be directly connected to a ninth switching element of the second masking circuit.

In an embodiment, the first masking circuit may include the first switching element including a control electrode connected to a first masking control node, a first electrode connected to the connecting control switching element and a second electrode connected to a second control node, a second switching element including a control electrode configured to receive the carry signal, a first electrode configured to receive a masking power signal and a second electrode connected to a first intermediate node, a third switching element including a control electrode configured to receive a first enable signal, a first electrode connected to the first intermediate node and a second electrode connected to the first masking control node, a fourth switching element including a control electrode configured to receive a second enable signal, a first electrode connected to the first masking control node and a second electrode connected to a second intermediate node, a fifth switching element including a control electrode configured to receive the carry signal, a first electrode connected to the second intermediate node and a second electrode configured to receive a low power voltage, a sixth switching element including a control electrode connected to the second control node, a first electrode configured to receive a first clock signal and a second electrode connected to a first gate output node, a seventh switching element including a control electrode configured to receive the carry signal, a first electrode connected to the first gate output node and a second electrode configured to receive the low power voltage and an eighth switching element including a control electrode configured to receive the carry signal, a first electrode configured to receive the first clock signal and a second electrode connected to the second control node.

In an embodiment, the second masking circuit may include a ninth switching element including a control electrode connected to a second masking control node, a first electrode connected to the first control node and a second electrode connected to a third control node, a tenth switching element including a control electrode configured to receive the carry signal, a first electrode configured to receive the masking power signal and a second electrode connected to a third intermediate node, an eleventh switching element including a control electrode configured to receive the first enable signal, a first electrode connected to the third intermediate node and a second electrode connected to the second masking control node, a twelfth switching element including a control electrode configured to receive the second enable signal, a first electrode connected to the second masking control node and a second electrode connected to a fourth intermediate node, a thirteenth switching element including a control electrode configured to receive the carry signal, a first electrode connected to the fourth intermediate node and a second electrode configured to receive the low power voltage, a fourteenth switching element including a control electrode connected to the third control node, a first electrode configured to receive the first clock signal and a second electrode connected to a second gate output node, a fifteenth switching element including a control electrode configured to receive the carry signal, a first electrode connected to the second gate output node and a second electrode configured to receive the low power voltage and a sixteenth switching element including a control electrode configured to receive the carry signal, a first electrode configured to receive the first clock signal and a second electrode connected to the third control node.

In an embodiment, the carry generator may include a first carry switching element including a control electrode configured to receive a second carry clock signal, a first electrode configured to receive the previous carry signal and a second electrode connected to a first carry node, a second carry switching element including a first control electrode configured to receive a first carry clock signal, a first electrode configured to receive the previous carry signal and a second electrode connected to the first carry node, a fourth carry switching element including a control electrode connected to the first carry node, a first electrode configured to receive a high power voltage and a second electrode connected to a second carry node, a fifth carry switching element including a first control electrode connected to the first carry node, a first electrode configured to receive a low power voltage and a second electrode connected to the second carry node, a seventh carry switching element including a control electrode connected to the second carry node, a first electrode configured to receive the high power voltage and a second electrode connected to a carry output node and an eighth carry switching element including a first control electrode connected to the second carry node, a first electrode configured to receive the low power voltage and a second electrode connected to the carry output node.

In an embodiment, the carry generator may further include a third carry switching element including a control electrode connected to a ground, a first electrode connected to the ground and a second electrode connected to a second control electrode of the second carry switching element, a sixth carry switching element including a control electrode connected to the ground, a first electrode connected to the ground and a second electrode connected to a second control electrode of the fifth carry switching element and a ninth carry switching element including a control electrode connected to the ground, a first electrode connected to the ground and a second electrode connected to a second control electrode of the eighth carry switching element.

In an embodiment, the first gate signal may be configured to output a single pulse in a frame. The second gate signal may be configured to output two pulses in the frame.

In an embodiment of a display apparatus according to the present invention, the display apparatus includes: a display panel, a gate driver and a data driver. The display panel includes a pixel including a switching element of a first type and a switching element of a second type different from the first type. The gate driver is configured to output a first gate signal and a second gate signal to the display panel. The data driver is configured to output a data voltage to the display panel. The gate driver includes a carry generator configured to generate a carry signal based on a previous carry signal, a first masking circuit connected to the carry generator and configured to output the first gate signal and a second masking circuit connected to the carry generator and configured to output the second gate signal. The first masking circuit includes a connection control switching element connecting a first control node of the carry generator and a first switching element of the first masking circuit.

In an embodiment, the first control node of the carry generator may be directly connected to a ninth switching element of the second masking circuit.

In an embodiment, the pixel may include a first pixel switching element including a control electrode connected to a first pixel node, a first electrode connected to a second pixel node and a second electrode connected to a third pixel node, a second pixel switching element including a control electrode configured to receive a data writing gate signal, a first electrode configured to receive the data voltage and a second electrode connected to the second pixel node, a third pixel switching element including a control electrode configured to receive a compensation gate signal, a first electrode connected to the first pixel node and a second electrode connected to the third pixel node, a fourth pixel switching element including a control electrode configured to receive a data initialization gate signal, a first electrode configured to receive an initialization voltage and a second electrode connected to the first pixel node, a fifth pixel switching element including a control electrode configured to receive an emission signal, a first electrode configured to receive a pixel high power voltage and a second electrode connected to the second pixel node, a sixth pixel switching element including a control electrode configured to receive the emission signal, a first electrode connected to the third pixel node and a second electrode connected to an anode electrode of a light emitting element, a seventh pixel switching element including a control electrode configured to receive a light emitting element initialization gate signal, a first electrode configured to receive a light emitting element initialization voltage and a second electrode connected to the anode electrode of the light emitting element and the light emitting element including the anode electrode and a cathode electrode configured to receive a pixel low power voltage. A waveform of the first gate signal outputted from the first masking circuit may be different from a waveform of the second gate signal outputted from the second masking circuit. The first gate signal may be the data initialization gate signal. The second gate signal may be the compensation gate signal.

In an embodiment, the pixel may include a first pixel switching element including a control electrode connected to a first pixel node, a first electrode connected to a second pixel node and a second electrode connected to a third pixel node, a second pixel switching element including a control electrode configured to receive a data writing gate signal, a first electrode configured to receive the data voltage and a second electrode connected to the second pixel node, a third pixel switching element including a control electrode configured to receive a compensation gate signal, a first electrode connected to the first pixel node and a second electrode connected to the third pixel node, a fourth pixel switching element including a control electrode configured to receive a data initialization gate signal, a first electrode configured to receive an initialization voltage and a second electrode connected to the first pixel node, a fifth pixel switching element including a control electrode configured to receive an emission signal, a first electrode configured to receive a pixel high power voltage and a second electrode connected to the second pixel node, a sixth pixel switching element including a control electrode configured to receive the emission signal, a first electrode connected to the third pixel node and a second electrode connected to an anode electrode of a light emitting element, a seventh pixel switching element including a control electrode configured to receive a light emitting element initialization gate signal, a first electrode configured to receive a light emitting element initialization voltage and a second electrode connected to the anode electrode of the light emitting element and the light emitting element including the anode electrode and a cathode electrode configured to receive a pixel low power voltage. The light emitting element initialization gate signal may be a data writing gate signal of a previous stage. A waveform of the first gate signal outputted from the first masking circuit may be different from a waveform of the second gate signal outputted from the second masking circuit. The first gate signal may be the data initialization gate signal. The second gate signal may be the compensation gate signal.

In an embodiment, the pixel may include a first pixel switching element including a control electrode connected to a first pixel node, a first electrode connected to a second pixel node and a second electrode connected to a third pixel node, a second pixel switching element including a control electrode configured to receive a data writing gate signal, a first electrode configured to receive the data voltage and a second electrode connected to the second pixel node, a third pixel switching element including a control electrode configured to receive a compensation gate signal, a first electrode connected to the first pixel node and a second electrode connected to the third pixel node, a fourth pixel switching element including a control electrode configured to receive a data initialization gate signal, a first electrode configured to receive an initialization voltage and a second electrode connected to the first pixel node, a fifth pixel switching element including a control electrode configured to receive an emission signal, a first electrode configured to receive a pixel high power voltage and a second electrode connected to the second pixel node, a sixth pixel switching element including a control electrode configured to receive the emission signal, a first electrode connected to the third pixel node and a second electrode connected to an anode electrode of a light emitting element, a seventh pixel switching element including a control electrode configured to receive a light emitting element initialization gate signal, a first electrode configured to receive a light emitting element initialization voltage and a second electrode connected to the anode electrode of the light emitting element, an eighth pixel switching element including a control electrode configured to receive a bias gate signal, a first electrode configured to receive a bias voltage and a second electrode connected to the second pixel node and the light emitting element including the anode electrode and a cathode electrode configured to receive a pixel low power voltage. A waveform of the first gate signal outputted from the first masking circuit may be different from a waveform of the second gate signal outputted from the second masking circuit. The first gate signal may be the data initialization gate signal. The second gate signal may be the compensation gate signal.

According to the gate signal masking circuit, the gate driver and the display apparatus, the output of the gate signal may be controlled based on the carry signal, the first enable signal and the second enable signal so that the multiple division of the driving frequency may be supported. Through the multiple division of the driving frequency, the power consumption of the display apparatus may be effectively reduced.

In addition, when the first gate signal generator for generating the data initialization gate signal and the second gate signal generator for generating the compensation gate signal are formed in common, the first masking circuit for outputting the data initialization gate signal further includes the control switching element but the second masking circuit for outputting the compensation gate signal does not further include the control switching element so that the waveforms of the data initialization gate signal and the compensation gate signal may be generated differently. The data initialization gate signal and the compensation gate signal are generated differently so that the display quality of the display panel may be effectively enhanced.

BRIEF DESCRIPTION OF THE DRAWINGS

The above and other features and advantages of the invention will become more apparent by describing in detailed embodiments thereof with reference to the accompanying drawings, in which.

DETAILED DESCRIPTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. Hereinafter, the present invention will be explained in detail with reference to the accompanying drawings.

Figure 1:
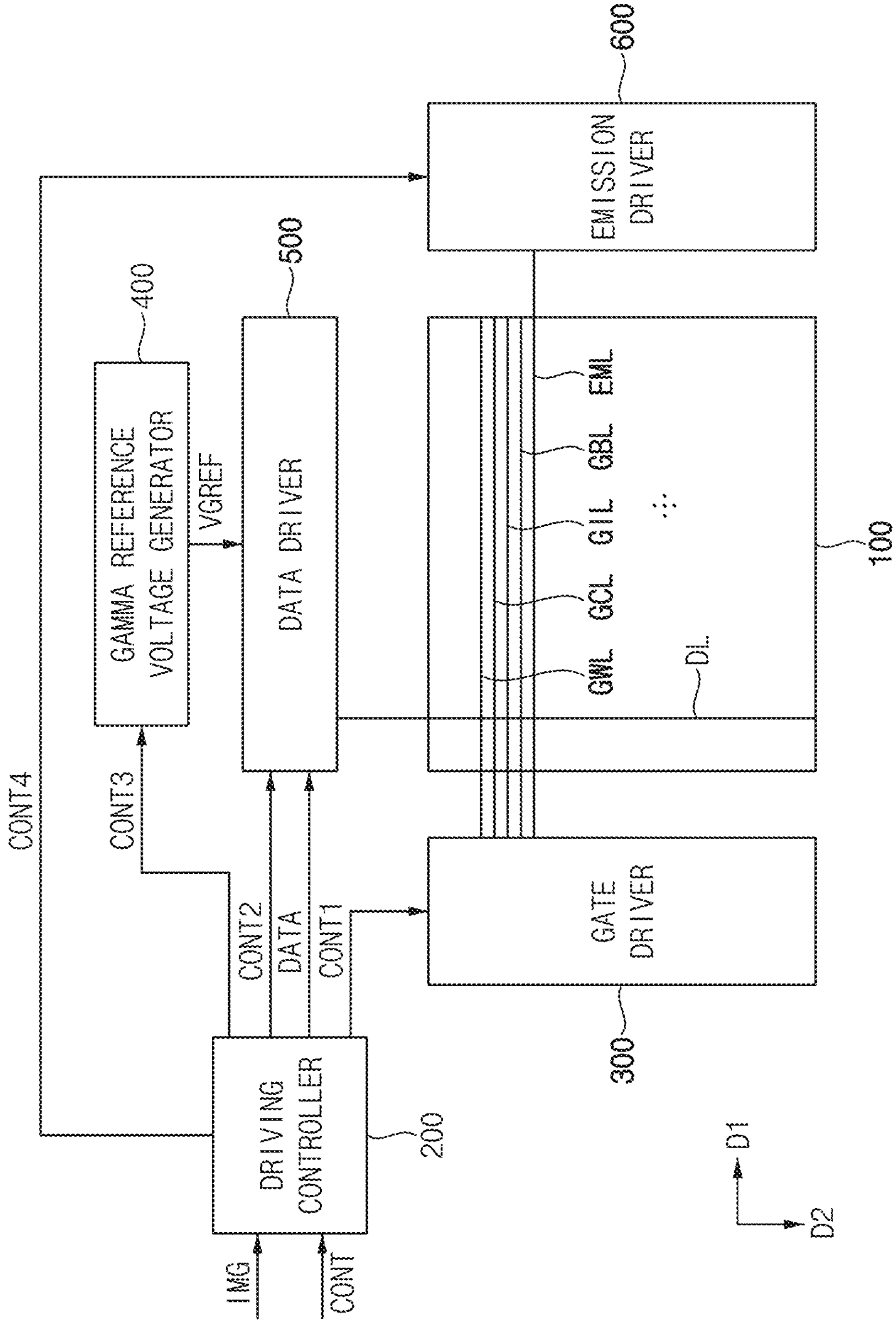
FIG. 1 is a block diagram illustrating a display apparatus according to an embodiment of the present invention.

FIG. 1 is a block diagram illustrating a display apparatus according to an embodiment of the present invention.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 has a display region on which an image is displayed and a peripheral region adjacent to the display region.

The display panel 100 includes a plurality of gate lines GWL, GCL, GIL and GBL, a plurality of data lines DL, a plurality of emission lines EML and a plurality of pixels electrically connected to the gate lines GWL, GCL, GIL and GBL, the data lines DL and the emission lines EML. The gate lines GWL, GCL, GIL and GBL may extend in a first direction D1, the data lines DL may extend in a second direction D2 crossing the first direction D1 and the emission lines EML may extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GCL, GIL and GBL in response to the first control signal CONT1 received from the driving controller 200. The gate driver 300 may sequentially output the gate signals to the gate lines GWL, GCL, GIL and GBL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EML in response to the fourth control signal CONT4 received from the driving controller 200. The emission driver 600 may output the emission signals to the emission lines EML.

Although the gate driver 300 is disposed at a first side of the display panel 100 and the emission driver 600 is disposed at a second side of the display panel 100 opposite to the first side in FIG. 1 for convenience of explanation, the present invention may not be limited thereto. For example, both of the gate driver 300 and the emission driver 600 may be disposed at the first side of the display panel 100. For example, the gate driver 300 and the emission driver 600 may be disposed at both sides of the display panel 100. For example, the gate driver 300 and the emission driver 600 may be integrally formed.

Figure 2:
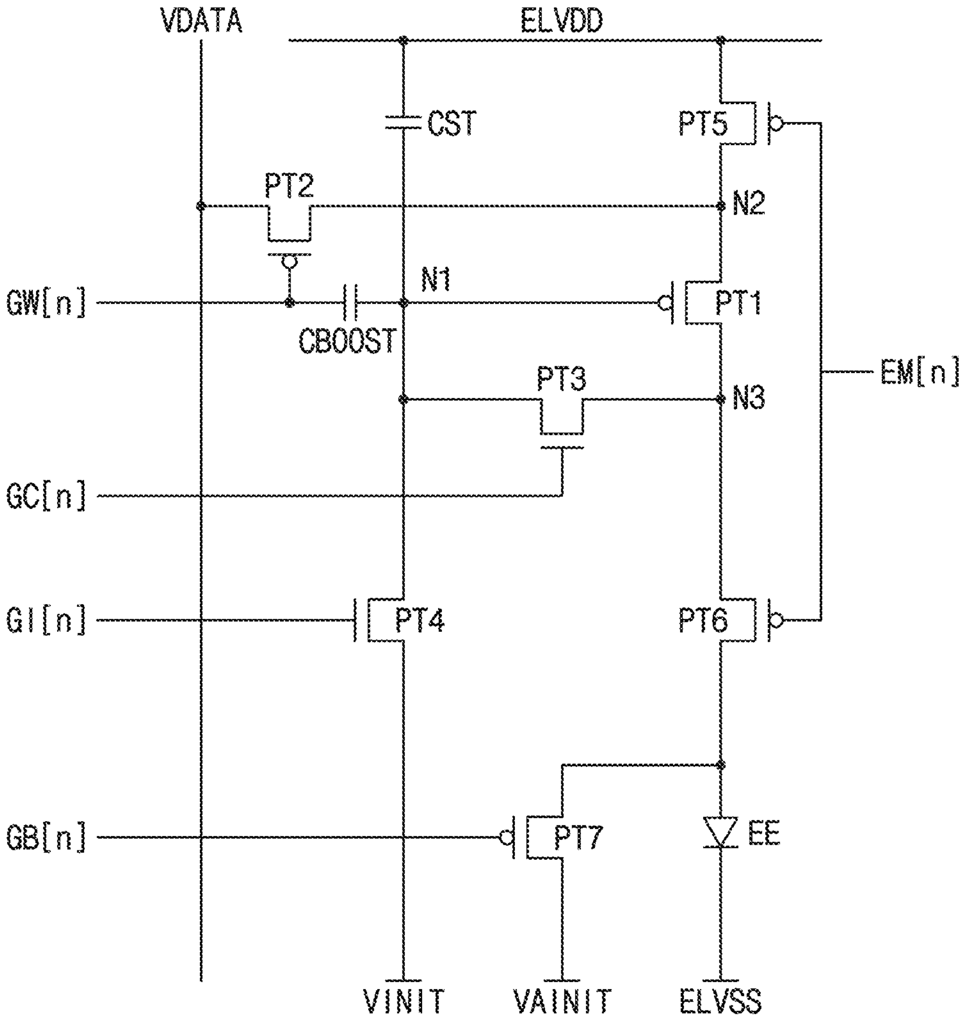
FIG. 2 is a circuit diagram illustrating an example of a pixel of the display panel of FIG. 1.

FIG. 2 is a circuit diagram illustrating an example of a pixel of the display panel 100 of FIG. 1.

Referring to FIGS. 1 and 2, the display panel 100 includes a plurality of pixels. Each of the pixels includes a light emitting element EE.

The pixel receives a data writing gate signal GW, a compensation gate signal GC, a data initialization gate signal GI, a light emitting element initialization signal GB, the data voltage VDATA and the emission signal EM and the light emitting element EE of the pixel emits light corresponding to the level of the data voltage VDATA to display the image.

In the present embodiment, the pixel may include a switching element of a first type and a switching element of a second type different from the first type. For example, the switching element of the first type may be a polysilicon thin film transistor. For example, the switching element of the first type may be a low temperature polysilicon ("LTPS") thin film transistor. For example, the switching element of the second type may be an oxide thin film transistor. For example, the switching element of the first type may be a P-type transistor and the switching element of the second type may be an N-type transistor.

At least one of the pixels may include first to seventh pixel switching elements PT1 to PT7 and the light emitting element EE.

The pixel may include a first pixel switching element PT1 including a control electrode connected to a first pixel node N1, a first electrode connected to a second pixel node N2 and a second electrode connected to a third pixel node N3, a second pixel switching element PT2 including a control electrode for receiving the data writing gate signal GW[n], a first electrode for receiving the data voltage VDATA and a second electrode connected to the second pixel node N2, a third pixel switching element PT3 including a control electrode for receiving the compensation gate signal GC[n], a first electrode connected to the first pixel node N1 and a second electrode connected to the third pixel node N3, a fourth pixel switching element PT4 including a control electrode for receiving the data initialization gate signal GI[n], a first electrode for receiving an initialization voltage VINIT and a second electrode connected to the first pixel node N1, a fifth pixel switching element PT5 including a control electrode for receiving the emission signal EM[n], a first electrode for receiving a pixel high power voltage ELVDD and a second electrode connected to the second pixel node N2, a sixth pixel switching element PT6 including a control electrode for receiving the emission signal EM[n], a first electrode connected to the third pixel node N3 and a second electrode connected to an anode electrode of the light emitting element EE, a seventh pixel switching element PT7 including a control electrode for receiving the light emitting element initialization gate signal GB[n], a first electrode for receiving a light emitting element initialization voltage VAINIT and a second electrode connected to the anode electrode of the light emitting element EE and the light emitting element EE including the anode electrode and a cathode electrode for receiving a pixel low power voltage ELVSS.

The pixel may further include a storage capacitor CST including a first electrode for receiving the pixel high power voltage ELVDD and a second electrode connected to the first pixel node N1 and a boosting capacitor CBOOST including a first electrode the data writing gate signal GW[n] and a second electrode connected to the first pixel node N1.

A driving current may flow through the fifth pixel switching element PT5, the first pixel switching element PT1 and the sixth pixel switching element PT6 to drive the light emitting element EE. An intensity of the driving current may be determined by the level of the data voltage VDATA. A luminance of the light emitting element EE may be determined by the intensity of the driving current.

In the present embodiment, when the image displayed on the display panel 100 is a static image or the display panel is operated in always on mode, a driving frequency of the display panel 100 may be decreased to reduce a power consumption. When all of the switching elements of the pixel of the display panel 100 are polysilicon thin film transistor, a flicker may be generated due to a leakage current of the pixel switching element in the low frequency driving mode. Thus, some of the pixel switching elements may be designed using the oxide thin film transistors. In the present exemplary embodiment, the third pixel switching element PT3 and the fourth pixel switching element PT4 may be the oxide thin film transistors. The first pixel switching element T1, the second pixel switching element T2, the fifth pixel switching element T5, the sixth pixel switching element T6 and the seventh pixel switching element PT7 may be the polysilicon thin film transistors.

Although some of the pixel switching elements are the oxide thin film transistors and other pixel switching elements are the polysilicon thin film transistors in the present embodiment, the present invention may not be limited thereto. The present invention may be applied to the pixel including only the oxide thin film transistors. Although some of the pixel switching elements are the N-type transistors and other pixel switching elements are the P-type transistors in the present embodiment, the present invention may not be limited thereto. The present invention may be applied to the pixel including only the N-type transistors.

Figure 3:
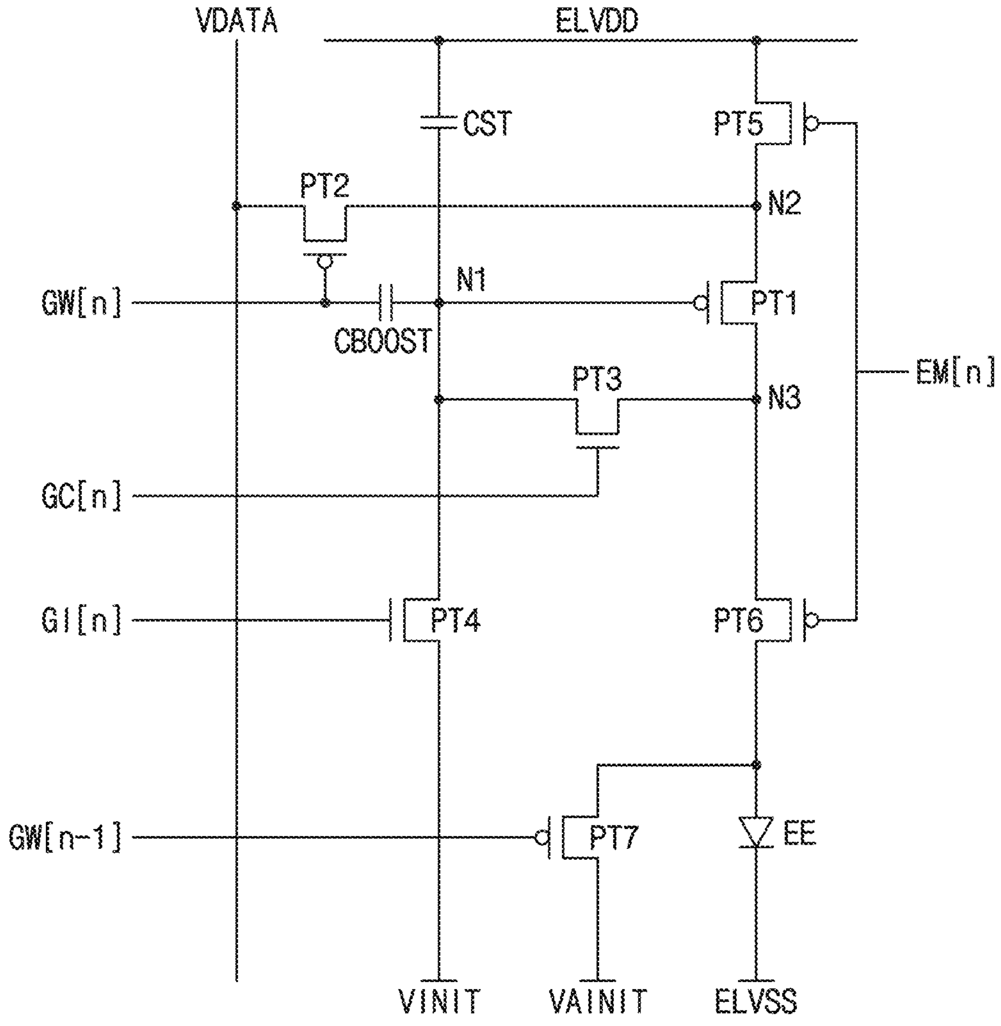
FIG. 3 is a circuit diagram illustrating another example of a pixel of the display panel of FIG. 1.

FIG. 3 is a circuit diagram illustrating another example of a pixel of the display panel 100 of FIG. 1.

Referring to FIGS. 1 and 3, the display panel 100 includes a plurality of pixels. Each of the pixels includes a light emitting element EE.

The pixel receives a data writing gate signal GW, a compensation gate signal GC, a data initialization gate signal GI, a light emitting element initialization signal GB, the data voltage VDATA and the emission signal EM and the light emitting element EE of the pixel emits light corresponding to the level of the data voltage VDATA to display the image.

In the present embodiment, the pixel may include a switching element of a first type and a switching element of a second type different from the first type. For example, the switching element of the first type may be a polysilicon thin film transistor. For example, the switching element of the first type may be a low temperature polysilicon (LTPS) thin film transistor. For example, the switching element of the second type may be an oxide thin film transistor. For example, the switching element of the first type may be a P-type transistor and the switching element of the second type may be an N-type transistor.

At least one of the pixels may include first to seventh pixel switching elements PT1 to PT7 and the light emitting element EE.

The pixel may include a first pixel switching element PT1 including a control electrode connected to a first pixel node N1, a first electrode connected to a second pixel node N2 and a second electrode connected to a third pixel node N3, a second pixel switching element PT2 including a control electrode for receiving the data writing gate signal GW[n], a first electrode for receiving the data voltage VDATA and a second electrode connected to the second pixel node N2, the third pixel switching element PT3 including a control electrode for receiving the compensation gate signal GC[n], a first electrode connected to the first pixel node N1 and a second electrode connected to the third pixel node N3, a fourth pixel switching element PT4 including a control electrode for receiving the data initialization gate signal GI[n], a first electrode for receiving an initialization voltage VINIT and a second electrode connected to the first pixel node N1, a fifth pixel switching element PT5 including a control electrode for receiving the emission signal EM[n], a first electrode for receiving a pixel high power voltage ELVDD and a second electrode connected to the second pixel node N2, a sixth pixel switching element PT6 including a control electrode for receiving the emission signal EM[n], a first electrode connected to the third pixel node N3 and a second electrode connected to an anode electrode of the light emitting element EE, a seventh pixel switching element PT7 including a control electrode for receiving the light emitting element initialization gate signal GB[n], a first electrode for receiving a light emitting element initialization voltage VAINIT and a second electrode connected to the anode electrode of the light emitting element EE and the light emitting element EE including the anode electrode and a cathode electrode for receiving a pixel low power voltage ELVSS.

The pixel may further include a storage capacitor CST including a first electrode for receiving the pixel high power voltage ELVDD and a second electrode connected to the first pixel node N1 and a boosting capacitor CBOOST including a first electrode the data writing gate signal GW[n] and a second electrode connected to the first pixel node N1.

In the present embodiment, the light emitting element initialization gate signal GB[n] may be a data writing gate signal GW[n−1] of a previous stage (See FIG. 3). When the data writing gate signal GW[n−1] of the previous stage is used as the light emitting element initialization gate signal GB[n] of the present stage, a part of the gate signal generating circuit of the gate driver 300 may be omitted. Thus, the manufacturing cost of the display apparatus may be reduced and the dead space of the display apparatus may be reduced.

In the present embodiment, when the image displayed on the display panel 100 is a static image or the display panel is operated in always on mode, a driving frequency of the display panel 100 may be decreased to reduce a power consumption. When all of the switching elements of the pixel of the display panel 100 are polysilicon thin film transistor, a flicker may be generated due to a leakage current of the pixel switching element in the low frequency driving mode. Thus, some of the pixel switching elements may be designed using the oxide thin film transistors. In the present exemplary embodiment, the third pixel switching element PT3 and the fourth pixel switching element PT4 may be the oxide thin film transistors. The first pixel switching element T1, the second pixel switching element T2, the fifth pixel switching element T5, the sixth pixel switching element T6 and the seventh pixel switching element PT7 may be the polysilicon thin film transistors.

Although some of the pixel switching elements are the oxide thin film transistors and other pixel switching elements are the polysilicon thin film transistors in the present embodiment, the present invention may not be limited thereto. The present invention may be applied to the pixel including only the oxide thin film transistors. Although some of the pixel switching elements are the N-type transistors and other pixel switching elements are the P-type transistors in the present embodiment, the present invention may not be limited thereto. The present invention may be applied to the pixel including only the N-type transistors.

Figure 4:
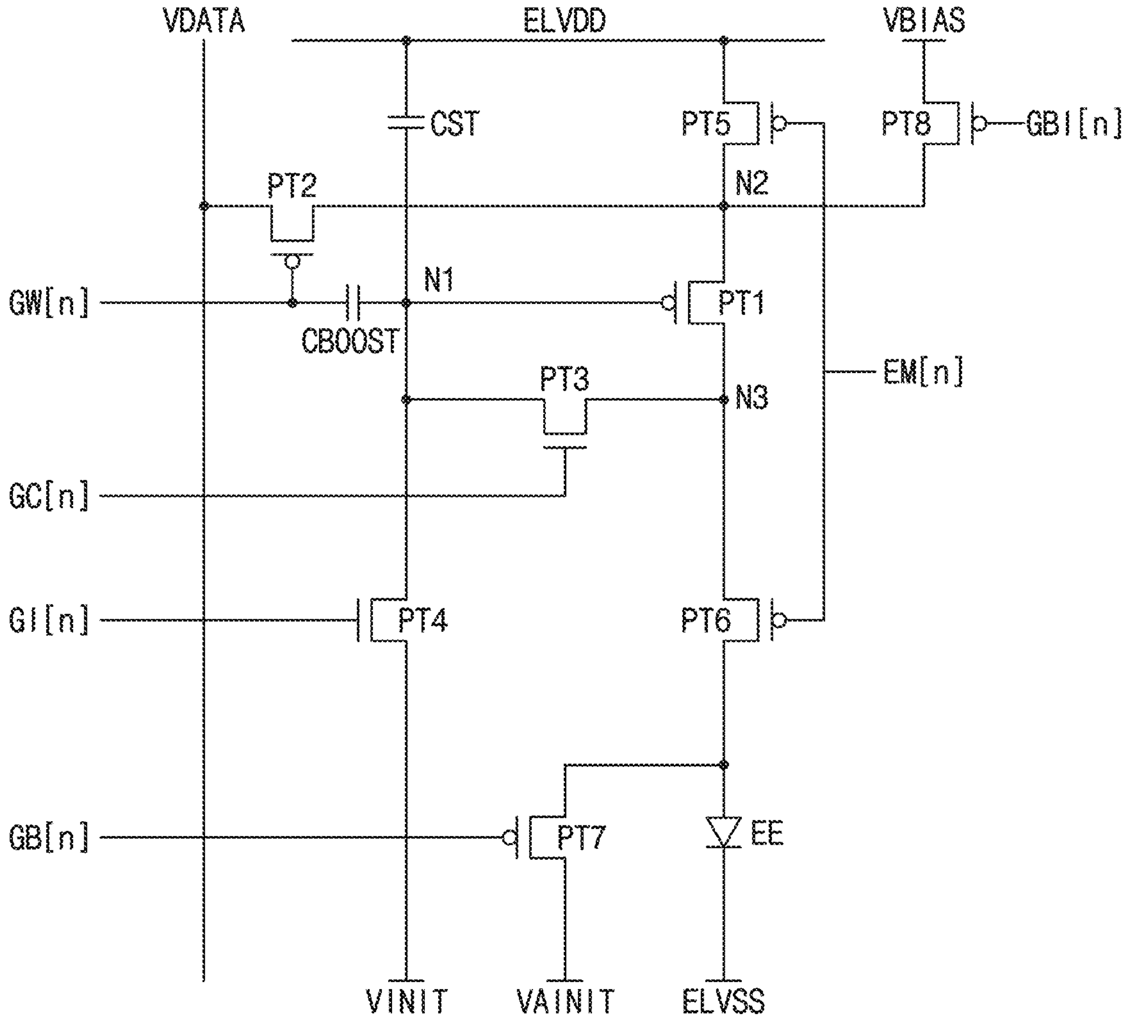
FIG. 4 is a circuit diagram illustrating still another example of a pixel of the display panel of FIG. 1.

FIG. 4 is a circuit diagram illustrating still another example of a pixel of the display panel 100 of FIG. 1.

Referring to FIGS. 1 and 4, the display panel 100 includes a plurality of pixels. Each of the pixels includes a light emitting element EE.

The pixel receives a data writing gate signal GW, a compensation gate signal GC, a data initialization gate signal GI, a light emitting element initialization signal GB, a bias gate signal GBI, the data voltage VDATA and the emission signal EM and the light emitting element EE of the pixel emits light corresponding to the level of the data voltage VDATA to display the image.

In the present embodiment, the pixel may include a switching element of a first type and a switching element of a second type different from the first type. For example, the switching element of the first type may be a polysilicon thin film transistor. For example, the switching element of the first type may be a low temperature polysilicon (LTPS) thin film transistor. For example, the switching element of the second type may be an oxide thin film transistor. For example, the switching element of the first type may be a P-type transistor and the switching element of the second type may be an N-type transistor.

At least one of the pixels may include first to eighth pixel switching elements PT1 to PT8 and the light emitting element EE.

The pixel may include a first pixel switching element PT1 including a control electrode connected to a first pixel node N1, a first electrode connected to a second pixel node N2 and a second electrode connected to a third pixel node N3, a second pixel switching element PT2 including a control electrode for receiving the data writing gate signal GW[n], a first electrode for receiving the data voltage VDATA and a second electrode connected to the second pixel node N2, the third pixel switching element PT3 including a control electrode for receiving the compensation gate signal GC[n], a first electrode connected to the first pixel node N1 and a second electrode connected to the third pixel node N3, a fourth pixel switching element PT4 including a control electrode for receiving the data initialization gate signal GI[n], a first electrode for receiving an initialization voltage VINIT and a second electrode connected to the first pixel node N1, a fifth pixel switching element PT5 including a control electrode for receiving the emission signal EM[n], a first electrode for receiving a pixel high power voltage ELVDD and a second electrode connected to the second pixel node N2, a sixth pixel switching element PT6 including a control electrode for receiving the emission signal EM[n], a first electrode connected to the third pixel node N3 and a second electrode connected to an anode electrode of the light emitting element EE, a seventh pixel switching element PT7 including a control electrode for receiving the light emitting element initialization gate signal GB[n], a first electrode for receiving a light emitting element initialization voltage VAINIT, an eighth pixel switching element PT8 including a control electrode for receiving the bias gate signal GBI[n], a first electrode for receiving a bias voltage VBIAS and a second electrode connected to the second pixel node N2 and the light emitting element EE including the anode electrode and a cathode electrode for receiving a pixel low power voltage ELVSS. (See FIG. 4)

The pixel may further include a storage capacitor CST including a first electrode for receiving the pixel high power voltage ELVDD and a second electrode connected to the first pixel node N1 and a boosting capacitor CBOOST including a first electrode the data writing gate signal GW[n] and a second electrode connected to the first pixel node N1.

In the present embodiment, when the image displayed on the display panel 100 is a static image or the display panel is operated in always on mode, a driving frequency of the display panel 100 may be decreased to reduce a power consumption. When all of the switching elements of the pixel of the display panel 100 are polysilicon thin film transistor, a flicker may be generated due to a leakage current of the pixel switching element in the low frequency driving mode. Thus, some of the pixel switching elements may be designed using the oxide thin film transistors. In the present exemplary embodiment, the third pixel switching element PT3 and the fourth pixel switching element PT4 may be the oxide thin film transistors. The first pixel switching element T1, the second pixel switching element T2, the fifth pixel switching element T5, the sixth pixel switching element T6 and the seventh pixel switching element PT7 may be the polysilicon thin film transistors.

Although some of the pixel switching elements are the oxide thin film transistors and other pixel switching elements are the polysilicon thin film transistors in the present embodiment, the present invention may not be limited thereto. The present invention may be applied to the pixel including only the oxide thin film transistors. Although some of the pixel switching elements are the N-type transistors and other pixel switching elements are the P-type transistors in the present embodiment, the present invention may not be limited thereto. The present invention may be applied to the pixel including only the N-type transistors.

Figure 5:
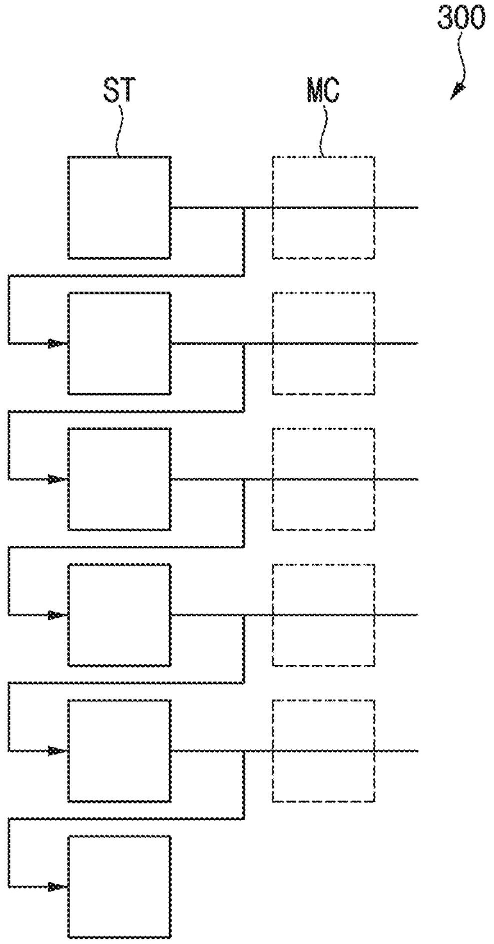
FIG. 5 is a conceptual diagram illustrating a gate driver of FIG. 1.
Figure 6:
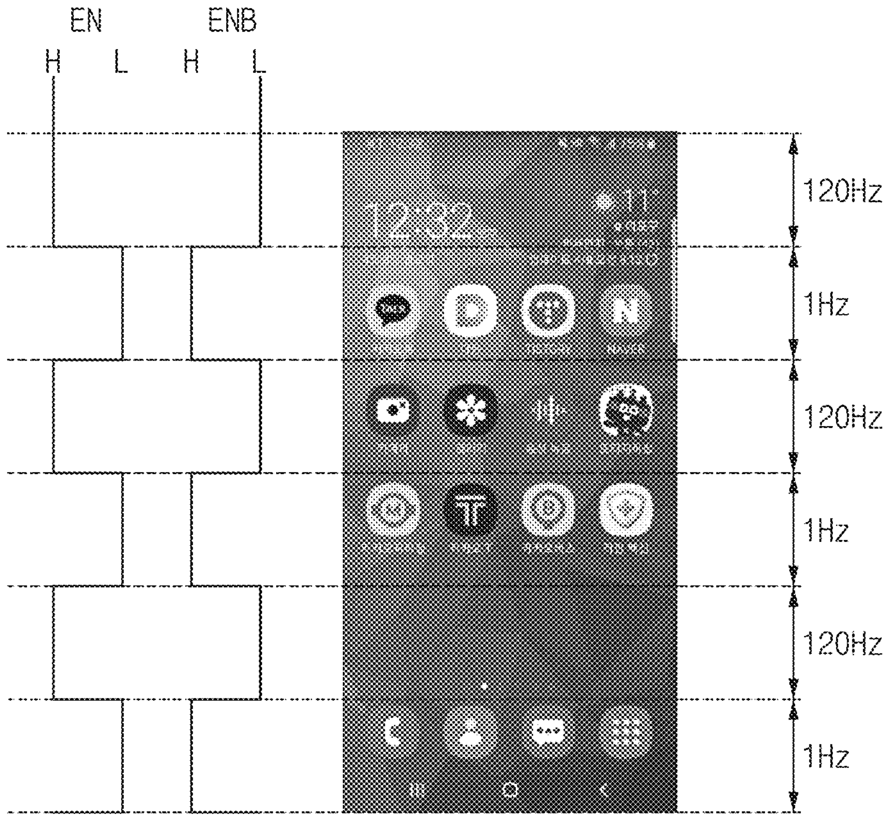
FIG. 6 is a conceptual diagram illustrating a first enable signal and a second enable signal applied to the gate driver of FIG. 1 according to driving frequencies of portions of the display panel of FIG. 1.

FIG. 5 is a conceptual diagram illustrating the gate driver 300 of FIG. 1. FIG. 6 is a conceptual diagram illustrating a first enable signal EN and a second enable signal ENB applied to the gate driver 300 of FIG. 1 according to driving frequencies of portions of the display panel 100 of FIG. 1.

Referring to FIGS. 1 to 6, the gate driver 300 may include a carry generator ST for generating a carry signal based on a previous carry signal and a gate signal masking circuit MC connected to the carry generator ST.

The gate signal masking circuit MC may output or not output a gate pulse according to the carry signal, the first enable signal EN and the second enable signal ENB.

For example, when the first enable signal EN has a high level H and the second enable signal ENB has a low level L, the gate signal masking circuit MC may output the gate pulse.

For example, when the first enable signal EN has a low level L and the second enable signal ENB has a high level H, the gate signal masking circuit MC may not output the gate pulse.

As shown in FIG. 6, according to the first enable signal EN and the second enable signal ENB, the gate driver 300 may output the gate pulse at a high frequency (e.g., 120 Hz) for a portion of the display panel 100 where a high frequency driving is necessary, and may output a gate pulse at a low frequency (e.g., 1 Hz) for a portion of the display panel 100 where a low frequency driving is necessary.

The gate signal masking circuit MC may mask an output of the gate pulse to output the gate pulse in the low frequency (e.g., 1 Hz). The carry generator ST transfers the carry signal to a next stage regardless of the operation of the gate signal masking circuit MC masking the output of the gate pulse so that the gate driver 300 may support the multiple division (i.e., providing different frequencies depending on regions) of the driving frequency.

Figure 7A:
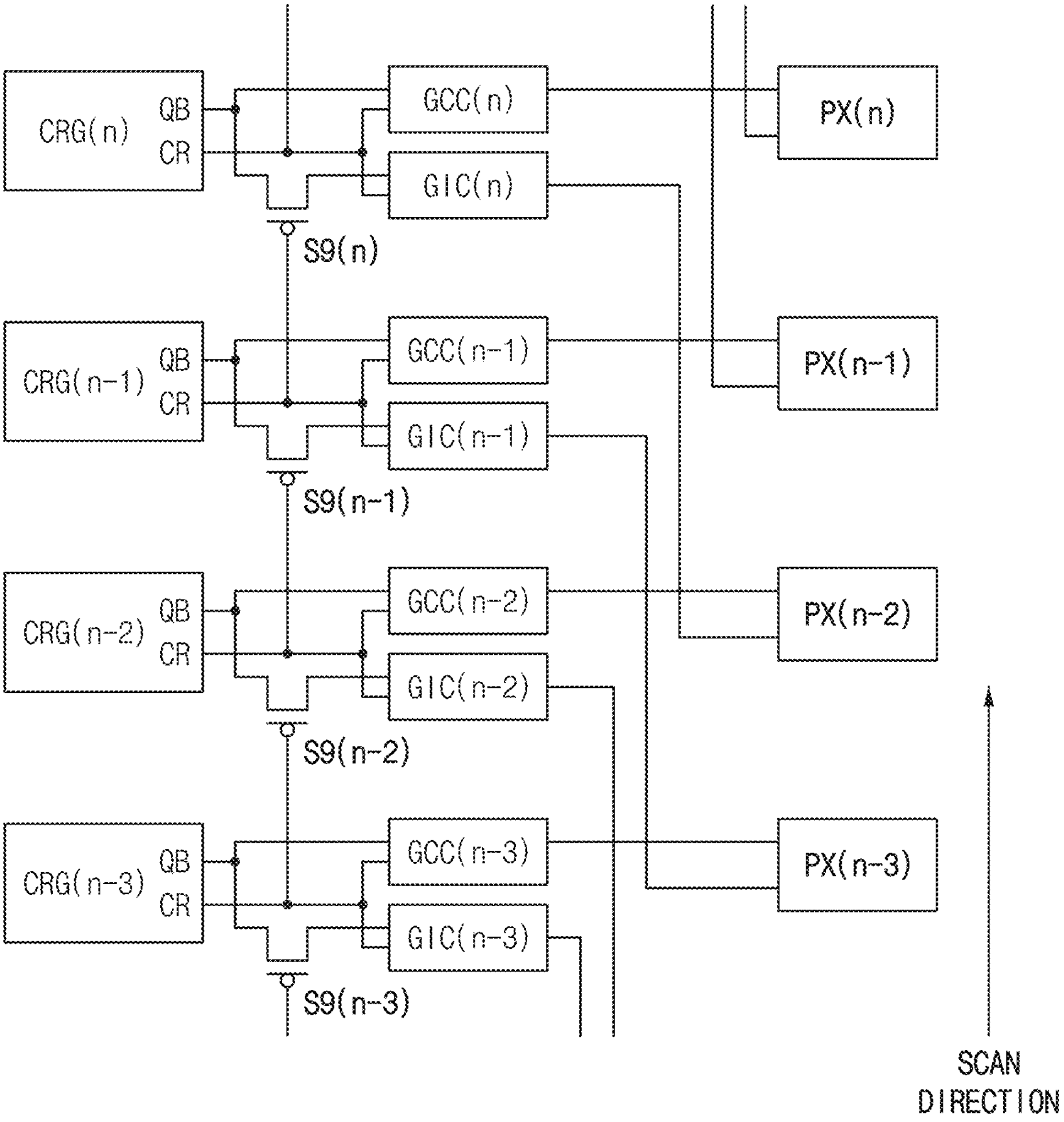
FIG. 7A is a block diagram illustrating examples of a carry generator, a first masking circuit and a second masking circuit of the gate driver of FIG. 1.
Figure 7B:
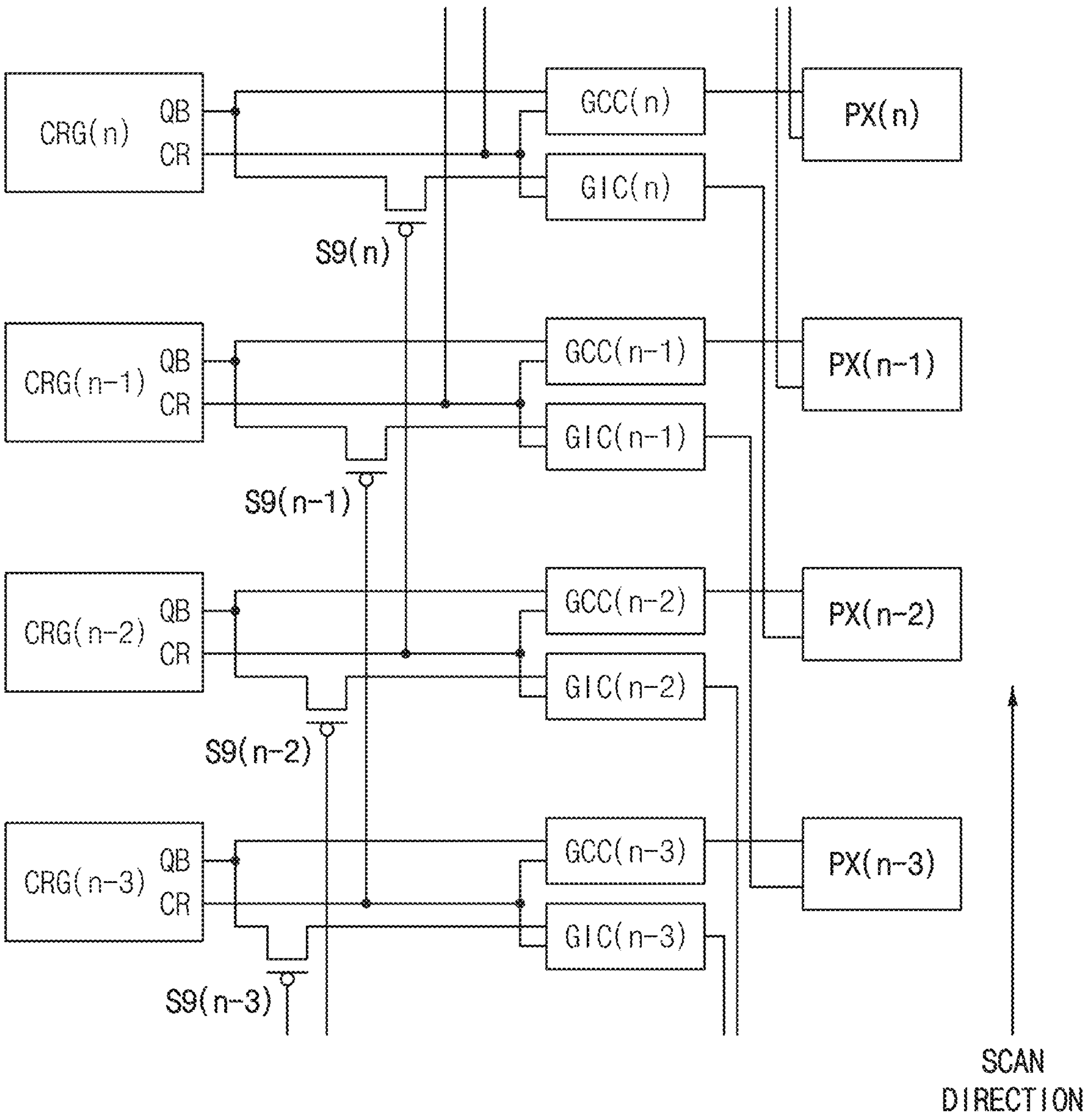
FIG. 7B is a block diagram illustrating other examples of a carry generator, a first masking circuit and a second masking circuit of the gate driver of FIG. 1.
Figure 8:
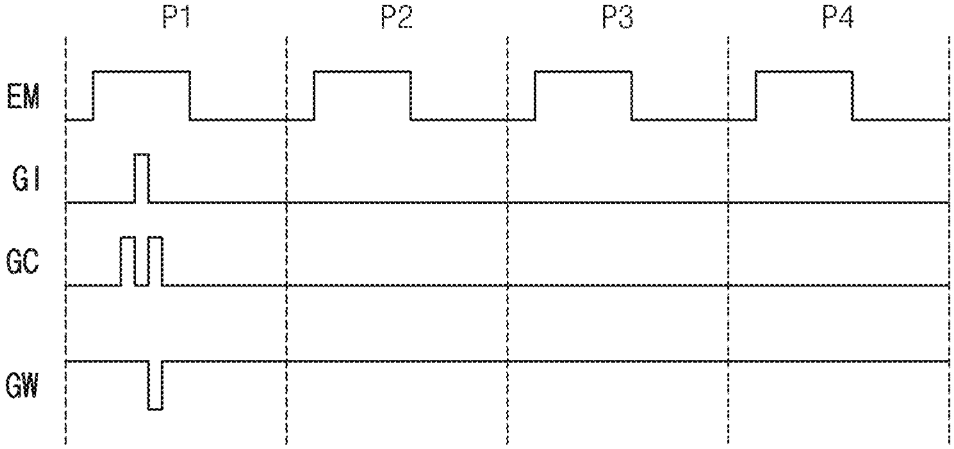
FIG. 8 is a timing diagram illustrating input signals applied to the pixel of FIG. 2 in a data writing period.
Figure 9:
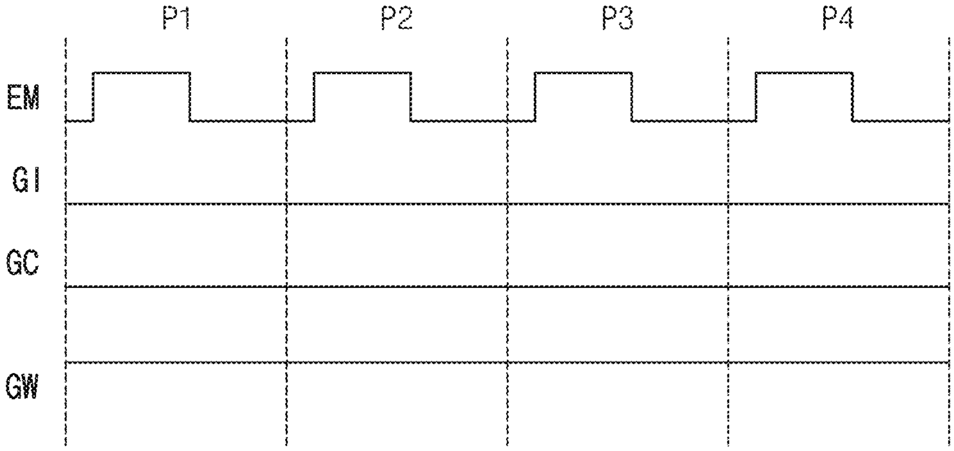
FIG. 9 is a timing diagram illustrating input signals applied to the pixel of FIG. 2 in a self-scan period.
Figure 10:
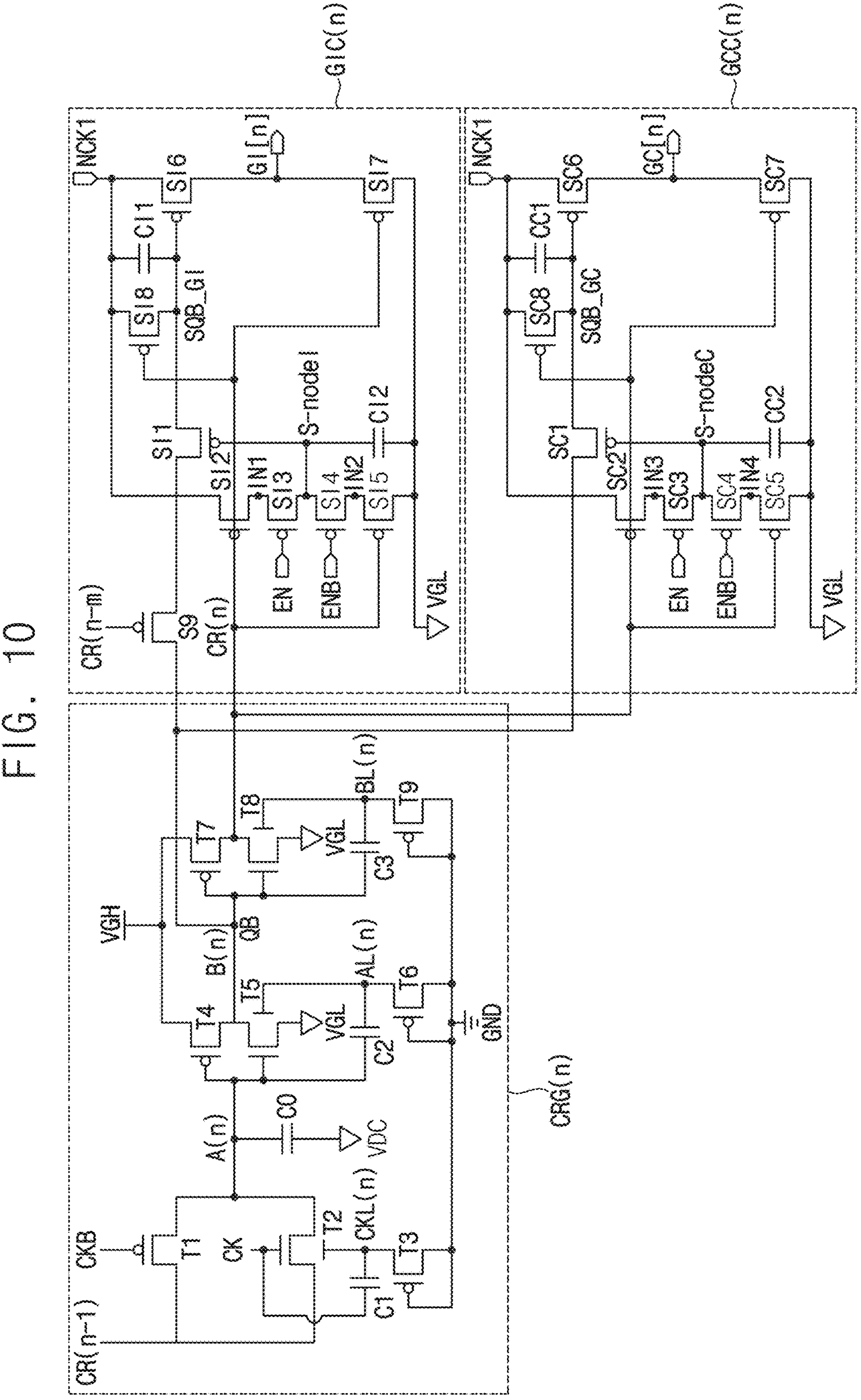
FIG. 10 is a circuit diagram illustrating the carry generator, the first masking circuit and the second masking circuit of the gate driver of FIG. 1.
Figure 11:
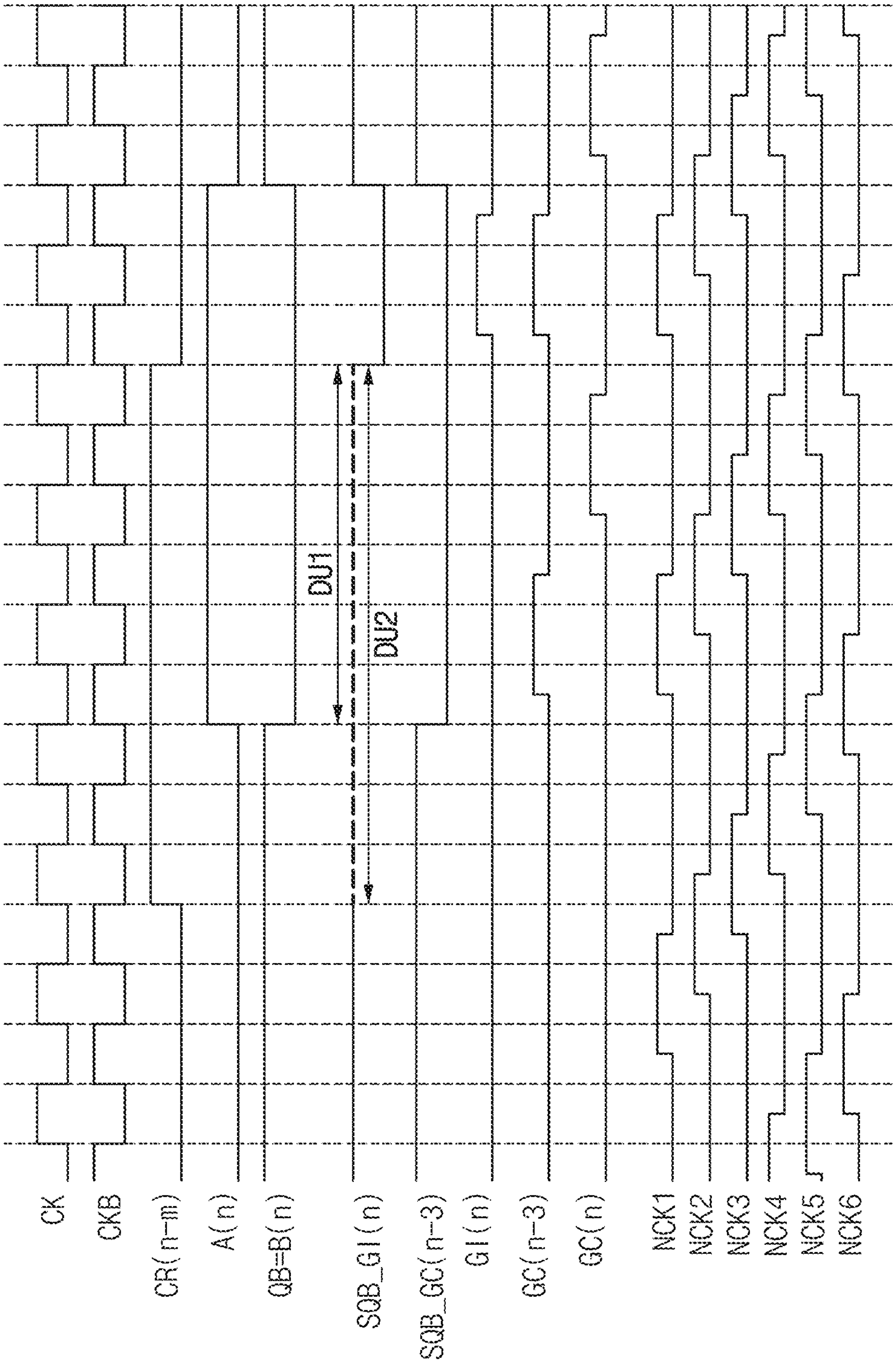
FIG. 11 is a timing diagram illustrating input signals, node signals and output signals of the carry generator, the first masking circuit and the second masking circuit of FIG. 10.

FIG. 7A is a block diagram illustrating examples of a carry generator CRG(n), a first masking circuit GIC(n) and a second masking circuit GCC(n) of the gate driver 300 of FIG. 1. FIG. 7B is a block diagram illustrating other examples of a carry generator CRG(n), a first masking circuit GIC(n) and a second masking circuit GCC(n) of the gate driver 300 of FIG. 1. FIG. 8 is a timing diagram illustrating input signals applied to the pixel of FIG. 2 in a data writing period. FIG. 9 is a timing diagram illustrating input signals applied to the pixel of FIG. 2 in a self-scan period. FIG. 10 is a circuit diagram illustrating the carry generator CRG(n), the first masking circuit GIC(n) and the second masking circuit GCC(n) of the gate driver 300 of FIG. 1. FIG. 11 is a timing diagram illustrating input signals, node signals and output signals of the carry generator CRG(n), the first masking circuit GIC(n) and the second masking circuit GCC(n) of FIG. 10.

Referring to FIGS. 1 to 11, for example, the gate driver 300 includes the carry generator CRG(n), the first masking circuit GIC(n) and the second masking circuit GCC(n).

The carry generator CRG(n) generates the carry signal CR(n) based on a previous carry signal CR(n−1). Although the previous carry signal CR(n−1) is a carry signal of a first previous stage in FIG. 10, the present invention may not be limited thereto. The previous carry signal may be one of carry signals of previous stages with respect to a present stage.

The first masking circuit GIC(n) is connected to the carry generator CRG(n) and outputs a first gate signal GI(n). The second masking circuit GCC(n) is connected to the carry generator CRG(n) and outputs a second gate signal GC(n).

For example, the first gate signal GI(n) may be the "data initialization gate signal" of FIGS. 2, 3 and 4. For example, the second gate signal GC(n) may be the "compensation gate signal" of FIGS. 2, 3 and 4.

The first masking circuit GIC(n) includes a connection control switching element S9 connecting a first control node QB of the carry generator CRG(n) and a first switching element SI1 of the first masking circuit GIC(n) based on a connection control signal (e.g. CR(n−m)).

In contrast, the second masking circuit GCC(n) does not include a connection control switching element connecting the first control node QB of the carry generator CRG(n) and a ninth switching element SC1 of the second masking circuit GCC(n) based on the connection control signal (e.g. CR(n−m)).

For example, the first control node QB of the carry generator CRG(n) may be connected to the first switching element SI1 of the first masking circuit GIC(n) through the connection control switching element S9. In contrast, the first control node QB of the carry generator CRG(n) may be directly connected to the ninth switching element SC1 of the second masking circuit GCC(n).

For example, the connection control signal applied to a control electrode of the connection control switching element S9 may be the carry signal CR(n−1) of the first previous stage as shown in FIG. 7A.

For example, the connection control signal applied to the control electrode of the connection control switching element S9 may be a carry signal CR(n−2) of a second previous stage as shown in FIG. 7B.

The present invention may not be limited to the cases of FIG. 7A and FIG. 7B. The connection control signal applied to the control electrode of the connection control switching element S9 may be one CR (n−m) of previous carry signals of previous stages. In addition, for example, the connection control switching element S9 may be a P-type transistor.

A single gate driver in FIG. 7A and FIG. 7B may generate both of the first gate signal GI and the second gate signal GC. For example, a first gate signal GI(n) generated by a first masking circuit GIC(n) of an n-th stage may be applied to a pixel PX(n−2) in an (n−2)-th pixel row. For example, a second gate signal GC(n) generated by a second masking circuit GCC(n) of the n-th stage may be applied to a pixel PX (n) in an n-th pixel row. Similarly, a first gate signal GI(n−1) generated by a first masking circuit GIC(n−1) of an (n−1)-th stage may be applied to a pixel PX(n−3) in an (n−3)-th pixel row. For example, a second gate signal GC(n−1) generated by a second masking circuit GCC(n−1) of the (n−1)-th stage may be applied to a pixel PX(n−1) in an (n−1)-th pixel row.

The first masking circuit GIC(n) may include: a first switching element SI1 including a control electrode connected to a first masking control node S-nodeI, a first electrode connected to the connection control switching element S9 and a second electrode connected to a second control node SQB_GI; a second switching element SI2 including a control electrode for receiving the carry signal CR(n), a first electrode for receiving a masking power signal (e.g. NCK1) and a second electrode connected to a first intermediate node IN1; a third switching element SI3 including a control electrode for receiving the first enable signal EN, a first electrode connected to the first intermediate node IN1 and a second electrode connected to the first masking control node S-nodeI; a fourth switching element SI4 including a control electrode for receiving the second enable signal ENB, a first electrode connected to the first masking control node S-nodeI and a second electrode connected to a second intermediate node IN2; and a fifth switching element SI5 including a control electrode for receiving the carry signal CR(n), a first electrode connected to the second intermediate node IN2 and a second electrode for receiving a low power voltage VGL.

The first masking circuit GIC(n) may further include: a sixth switching element SI6 including a control electrode connected to the second control node SQB_GI, a first electrode for receiving a first clock signal NCK1 and a second electrode connected to a first gate output node for outputting the first gate signal GI(n); a seventh switching element SI7 including a control electrode for receiving the carry signal CR(n), a first electrode connected to the first gate output node for outputting the first gate signal GI(n) and a second electrode for receiving the low power voltage VGL; and an eighth switching element SI8 including a control electrode for receiving the carry signal CR(n), a first electrode for receiving the first clock signal NCK1 and a second electrode connected to the second control node SQB_GI.

The first masking circuit GIC(n) may further include: a first masking capacitor CI1 including a first electrode for receiving the first clock signal NCK1 and a second electrode connected to the second control node SQB_GI; and a second masking capacitor CI2 including a first electrode connected to the first masking control node S-nodeI and a second electrode for receiving the low power voltage VGL.

The masking power signal may be the first clock signal NCK1. The first electrode of the second switching element SI2 may be connected to the first electrode of the sixth switching element SI6. Alternatively, the masking power signal may be a high power voltage VGH.

The second masking circuit GCC(n) may include: a ninth switching element SC1 including a control electrode connected to a second masking control node S-nodeC, a first electrode connected to the first control node QB and a second electrode connected to a third control node SQB_GC; a tenth switching element SC2 including a control electrode for receiving the carry signal CR(n), a first electrode for receiving the masking power signal (e.g. NCK1) and a second electrode connected to a third intermediate node IN3; an eleventh switching element SC3 including a control electrode for receiving the first enable Signal EN, a first electrode connected to the third intermediate node IN3 and a second electrode connected to the second masking control node S-nodeC; a twelfth switching element SC4 including a control electrode for receiving the second enable signal ENB, a first electrode connected to the second masking control node S-nodeC and a second electrode connected to a fourth intermediate node IN4; and a thirteenth switching element SC5 including a control electrode for receiving the carry signal CR(n), a first electrode connected to the fourth intermediate node IN4 and a second electrode for receiving the low power voltage VGL.

The second masking circuit GCC(n) may further include: a fourteenth switching element SC6 including a control electrode connected to the third control node SQB_GC, a first electrode for receiving a first clock signal NCK1 and a second electrode connected to a second gate output node for outputting the second gate signal GC(n); a fifteenth switching element SC7 including a control electrode for receiving the carry signal CR(n), a first electrode connected to the second gate output node for outputting the second gate signal GC(n) and a second electrode for receiving the low power voltage VGL; and a sixteenth switching element SC8 including a control electrode for receiving the carry signal CR(n), a first electrode for receiving the first clock signal NCK1 and a second electrode connected to the third control node SQB_GC.

The second masking circuit GCC(n) may further include: a third masking capacitor CC1 including a first electrode for receiving the first clock signal NCK1 and a second electrode connected to the third control node SQB_GC and a fourth masking capacitor CC2 including a first electrode connected to the second masking control node S-nodeC and a second electrode for receiving the low power voltage VGL.

For example, the carry generator CRG(n) may include input circuit T1, T2 and T3, a first inverter T4, T5 and T6 and a second inverter T7, T8 and T9.

The carry generator CRG(n) may include: a first carry switching element T1 including a control electrode for receiving a second carry clock signal CKB, a first electrode for receiving the previous carry signal CR(n−1) and a second electrode connected to a first carry node A(n); a second carry switching element T2 including a first control electrode for receiving a first carry clock signal CK, a first electrode for receiving the previous carry signal CR(n−1) and a second electrode connected to the first carry node A(n); a fourth carry switching element T4 including a control electrode connected to the first carry node A(n), a first electrode for receiving the high power voltage VGH and a second electrode connected to a second carry node B(n); a fifth carry switching element T5 including a first control electrode connected to the first carry node A(n), a first electrode for receiving the low power voltage VGL and a second electrode connected to the second carry node B(n); a seventh carry switching element T7 including a control electrode connected to the second carry node B(n), a first electrode for receiving the high power voltage VGH and a second electrode connected to a carry output node for outputting the carry signal CR(n); an eighth carry switching element T8 including a first control electrode connected to the second carry node B(n), a first electrode for receiving the low power voltage VGL and a second electrode connected to the carry output node.

The first carry switching element T1 may output the previous carry signal CR(n−1) to the first carry node A(n) in response to the second carry clock signal CKB. The second carry switching element T2 may output the previous carry signal CR(n−1) to the first carry node A(n) in response to the first carry clock signal CK. For example, the first carry switching element T1 may be a P-type transistor and the second carry switching element T2 may be an N-type dual transistor.

The fourth carry switching element T4 may be a P-type transistor and the fifth carry switching element T5 may be an N-type dual transistor. The fourth carry switching element T4 and the fifth carry switching element T5 may invert a signal of the first carry node A(n) and output the inverted signal of the first carry node A(n) to the second carry node B(n). Herein, the second carry node B(n) may be the first control node QB.

The seventh carry switching element T7 may be a P-type transistor and the eighth carry switching element T8 may be an N-type dual transistor. The seventh carry switching element T7 and the eighth carry switching element T8 may invert a signal of the second carry node B(n) and output the inverted signal of the second carry node B(n) to the carry output node B(n).

The carry generator CRG(n) may further include a third carry switching element T3 including a control electrode connected to a ground, a first electrode connected to the ground and a second electrode connected to a second control electrode of the second carry switching element T2, a sixth carry switching element T6 including a control electrode connected to the ground, a first electrode connected to the ground and a second electrode connected to a second control electrode of the fifth carry switching element T5 and a ninth carry switching element T9 including a control electrode connected to the ground, a first electrode connected to the ground and a second electrode connected to a second control electrode of the eighth carry switching element T8. The third carry switching element T3 may enhance a stability and a reliability of the second carry switching element T2. The sixth carry switching element T6 may enhance a stability and a reliability of the fifth carry switching element T5. The ninth carry switching element T9 may enhance a stability and a reliability of the eighth carry switching element T8.

The carry generator CRG(n) may further include a holding capacitor C0 including a first electrode connected to the first carry node A(n) and a second electrode for receiving a holding voltage VDC, a first capacitor C1 connected between the control electrode of the second carry switching element T2 and the second control electrode of the second carry switching element T2, a second capacitor C2 connected between the first control electrode of the fifth carry switching element T5 and the second control electrode of the fifth carry switching element T5 and a third capacitor C3 connected between the first control electrode of the eighth carry switching element T8 and the second control electrode of the eighth carry switching element T8.

In FIG. 11, the connection control switching element S9 may be turned off by the high level of the connection control signal CR(n−m) in a period DU2. When the connection control switching element S9 is turned off, the first control node QB and the second control node SQB_GI are disconnected. Thus, in the period DU2, the signal of the second control node SQB_GI maintains a high level which is a previous level. Accordingly, the output of the first gate signal GI(n) maintains a low level during a period DU1.

For example, the connection control signal CR(n−m) may be a carry signal of a third previous stage in FIG. 11. In addition, in the present embodiment, the first gate signal GI(n) of the present stage and the second gate signal GC(n−3) of the third previous stage may have the same timing (i.e., when the first gate signal GI(n) of the present stage changes, the second gate signal GC(n−3) of the third previous stage also changes.).

When the connection control switching element S9 does not exist, the first gate signal GI(n) of the present stage and the second gate signal GC(n−3) of the third previous stage may have the same waveform. However, the output of the first gate signal GI(n) maintains the low level during the period DU1 due to the connection control switching element S9 controlled by the connection control signal CR(n−m) so that the first gate signal GI(n) of the present stage and the second gate signal GC(n−3) of the third previous stage have different waveforms in the present embodiment as shown in FIG. 11 (e.g., there exist a duration that the first gate signal GI(n) of the present stage does not change while the second gate signal GC(n−3) of the third previous stage changes.).

In a low frequency driving mode, a driving timing of the display panel 100 includes a data writing period in which the data voltage is written to the pixel and the pixel emits a light and a self-scan period in which the data voltage is not written to the pixel and the pixel emits a light.

In a first frame P1 of FIG. 8 which is the data writing period, the data initialization gate signal GI, the compensation gate signal GC and the data writing gate signal GW may have active pulses. Second to fourth frames P2 to P4 of FIG. 8 may be the self-scan periods.

As shown in the first frame P1 of FIG. 8, the first gate signal GI may output a single pulse in the frame. As shown in the first frame P1 of FIG. 8, the second gate signal GC may output two pulses in the frame.

In contrast, in a first frame P1 of FIG. 9 which is the self-scan period, the data initialization gate signal GI, the compensation gate signal GC and the data writing gate signal GW may not have any active pulses. Second to fourth frames P2 to P4 of FIG. 9 may be the self-scan periods.

Figure 12:
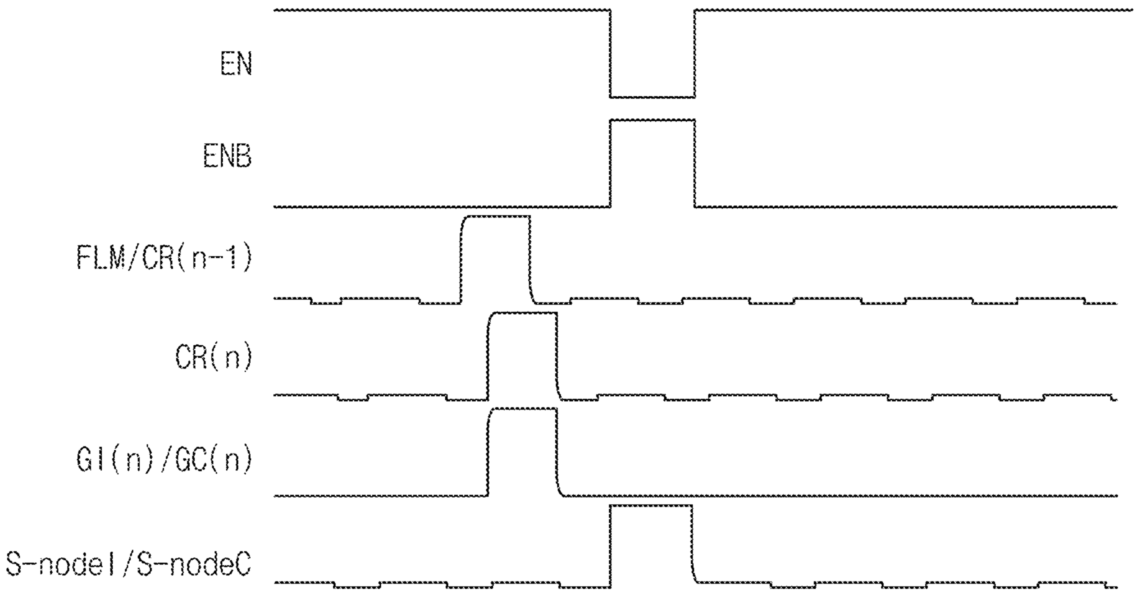
FIG. 12 is a timing diagram illustrating input signals, node signals and output signals of the carry generator, the first masking circuit and the second masking circuit of FIG. 10 in a first case.
Figure 13:
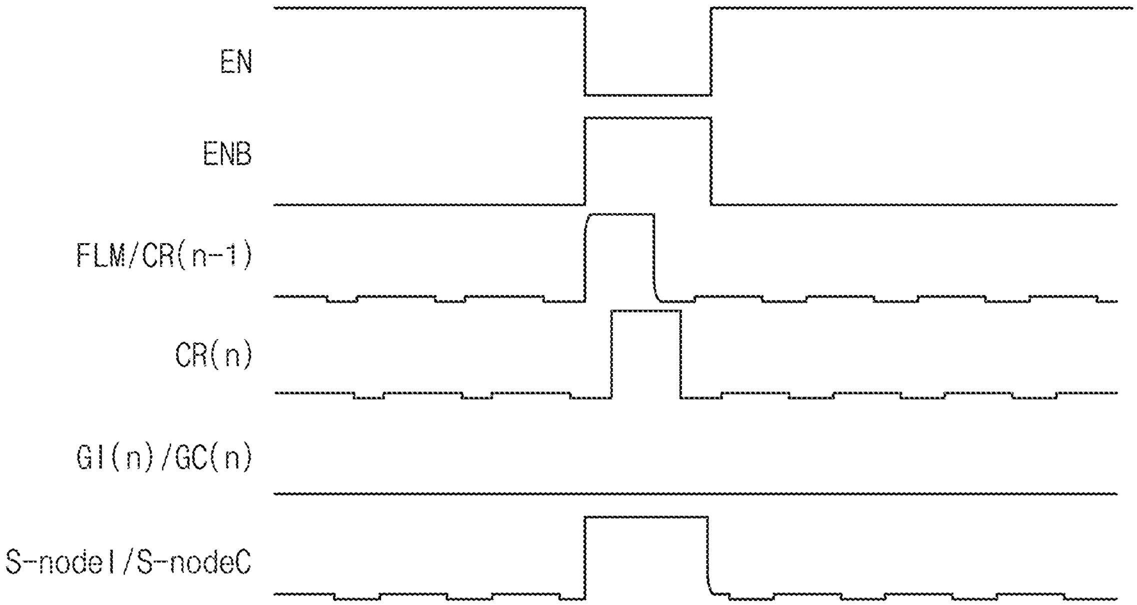
FIG. 13 is a timing diagram illustrating input signals, node signals and output signals of the carry generator, the first masking circuit and the second masking circuit of FIG. 10 in a second case.
Figure 14:
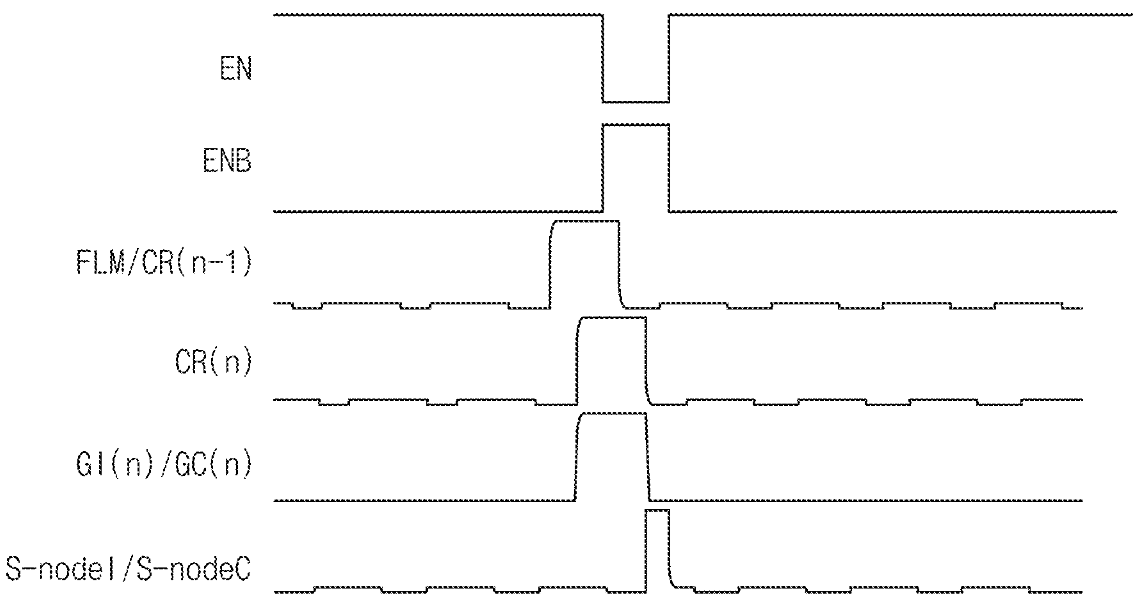
FIG. 14 is a timing diagram illustrating input signals, node signals and output signals of the carry generator, the first masking circuit and the second masking circuit of FIG. 10 in a third case.
Figure 15:
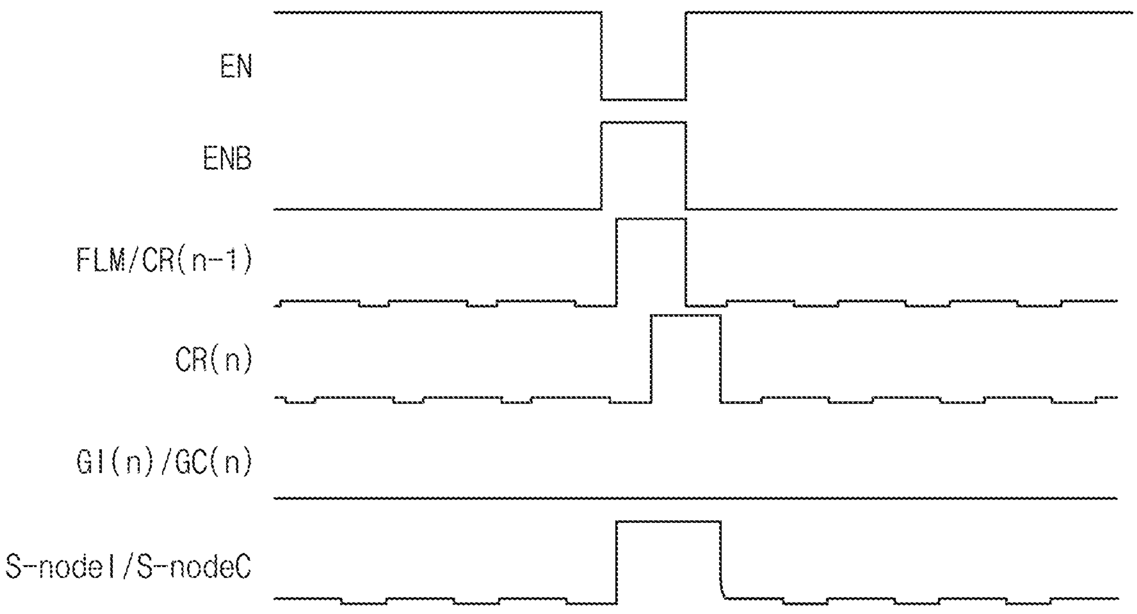
FIG. 15 is a timing diagram illustrating input signals, node signals and output signals of the carry generator, the first masking circuit and the second masking circuit of FIG. 10 in a fourth case.

FIG. 12 is a timing diagram illustrating input signals, node signals and output signals of the carry generator CRG(n), the first masking circuit GIC(n) and the second masking circuit GCC(n) of FIG. 10 in a first case. FIG. 13 is a timing diagram illustrating input signals, node signals and output signals of the carry generator CRG(n), the first masking circuit GIC(n) and the second masking circuit GCC(n) of FIG. 10 in a second case. FIG. 14 is a timing diagram illustrating input signals, node signals and output signals of the carry generator CRG(n), the first masking circuit GIC(n) and the second masking circuit GCC(n) of FIG. 10 in a third case. FIG. 15 is a timing diagram illustrating input signals, node signals and output signals of the carry generator CRG(n), the first masking circuit GIC(n) and the second masking circuit GCC(n) of FIG. 10 in a fourth case.

Hereinafter, the operations of the first masking circuit and the second masking circuit are explained in detail referring to FIGS. 12 to 15.

Referring to FIGS. 1 to 15, the signal of the first masking control node S-nodeI is determined by operations of the second to fifth switching element SI2 to SI5 and the signal of the second masking control node S-nodeC is determined by operations of the tenth to thirteenth switching element SC2 to SC5.

Hereinafter, the operation of the first masking circuit GIC(n) is described, and the operation of the second masking circuit GCC(n) is substantially the same as the operation of the first masking circuit GIC(n).

For example, when the carry signal CR(n) has the low level and the first enable signal EN has the low level, the second switching element SI2 and the third switching element SI3 are turned on so that the masking power signal NCK1 may be applied to the first masking control node S-nodeI.

The second enable signal ENB may be an inverted signal of the first enable signal EN. Thus, when the third switching element SI3 is turned on in response to the first enable signal EN, the fourth switching element SI4 may be turned off in response to the second enable signal ENB.

For example, when the carry signal CR(n) has the low level and the second enable signal ENB has the low level, the fourth switching element SI4 and the fifth switching element SI5 are turned on so that the low power voltage VGL may be applied to the first masking control node S-nodeI.

The second enable signal ENB may be an inverted signal of the first enable signal EN. Thus, when the fourth switching element SI4 is turned on in response to the second enable signal ENB, the third switching element SI3 may be turned off in response to the first enable signal EN.

When the carry signal CR(n) has the high level, the second switching element SI2 and the fifth switching element SI5 are turned off so that the first masking control node S-nodeI may maintain a previous state regardless of the state of the first enable signal EN and the state of the second enable signal ENB.

FIG. 12 illustrates a case where the first enable signal EN has an inactive level (e.g., a high level) in all periods in which the carry signal CR(n) has an active level (e.g., a high level).

When the first enable signal EN has the inactive level in all periods in which the carry signal CR(n) has the active level, the first masking circuit GIC(n) may output the gate pulse GI(n).

FIG. 13 illustrates a case where the first enable signal EN has an active level (e.g., a low level) in all periods in which the carry signal CR(n) has the active level (e.g., a high level). As used herein, the "active level" is defined as a signal level to turn on a corresponding switching element, and the "inactive level" is defined as a signal level to turn off a corresponding switching element.

When the first enable signal EN has the active level in all periods in which the carry signal CR(n) has the active level, the first masking circuit GIC(n) may not output the gate pulse.

FIG. 14 illustrates a case where the first enable signal EN is changed from the inactive level (e.g., a high level) to the active level (e.g., a low level) during a period in which the carry signal CR(n) has the active level (e.g., a high level).

When the first enable signal EN is changed from the inactive level to the active level during a period in which the carry signal CR(n) has the active level, the first masking circuit GIC(n) may output the gate pulse GI(n).

FIG. 15 illustrates a case where the first enable signal EN is changed from the active level (e.g., a low level) to the inactive level (e.g., a high level) during a period in which the carry signal CR(n) has the active level (e.g., a high level).

When the first enable signal EN is changed from the active level to the inactive level during a period in which the carry signal CR(n) has the active level, the first masking circuit GI(n) may not output the gate pulse.

Referring again to FIGS. 12 to 15, when the first enable signal EN has the inactive level (e.g., the high level) at the rising edge of the carry signal CR(n), the first masking circuit GIC(n) may output the gate pulse (e.g., FIGS. 12 and 14). In contrast, when the first enable signal EN has the active level (e.g., the low level) at the rising edge of the carry signal CR(n), the first masking circuit GIC(n) may not output the gate pulse (e.g., FIGS. 13 and 15).

According to the present embodiment, the output of the gate signal may be controlled based on the carry signal CR(n), the first enable signal EN and the second enable signal ENB so that the multiple division of the driving frequency may be supported. Through the multiple division of the driving frequency, the power consumption of the display apparatus may be effectively reduced.

In addition, when the first gate signal generator for generating the data initialization gate signal GI(n) and the second gate signal generator for generating the compensation gate signal GC(n) are formed in common, the first masking circuit GIC(n) for outputting the data initialization gate signal GI(n) further includes the control switching element S9 but the second masking circuit GCC(n) for outputting the compensation gate signal GC(n) does not further include the control switching element S9 so that the waveforms of the data initialization gate signal GI(n) and the compensation gate signal GC(n) may be generated differently. The data initialization gate signal GI(n) and the compensation gate signal GC(n) are generated differently so that the display quality of the display panel 100 may be enhanced.

Figure 16:
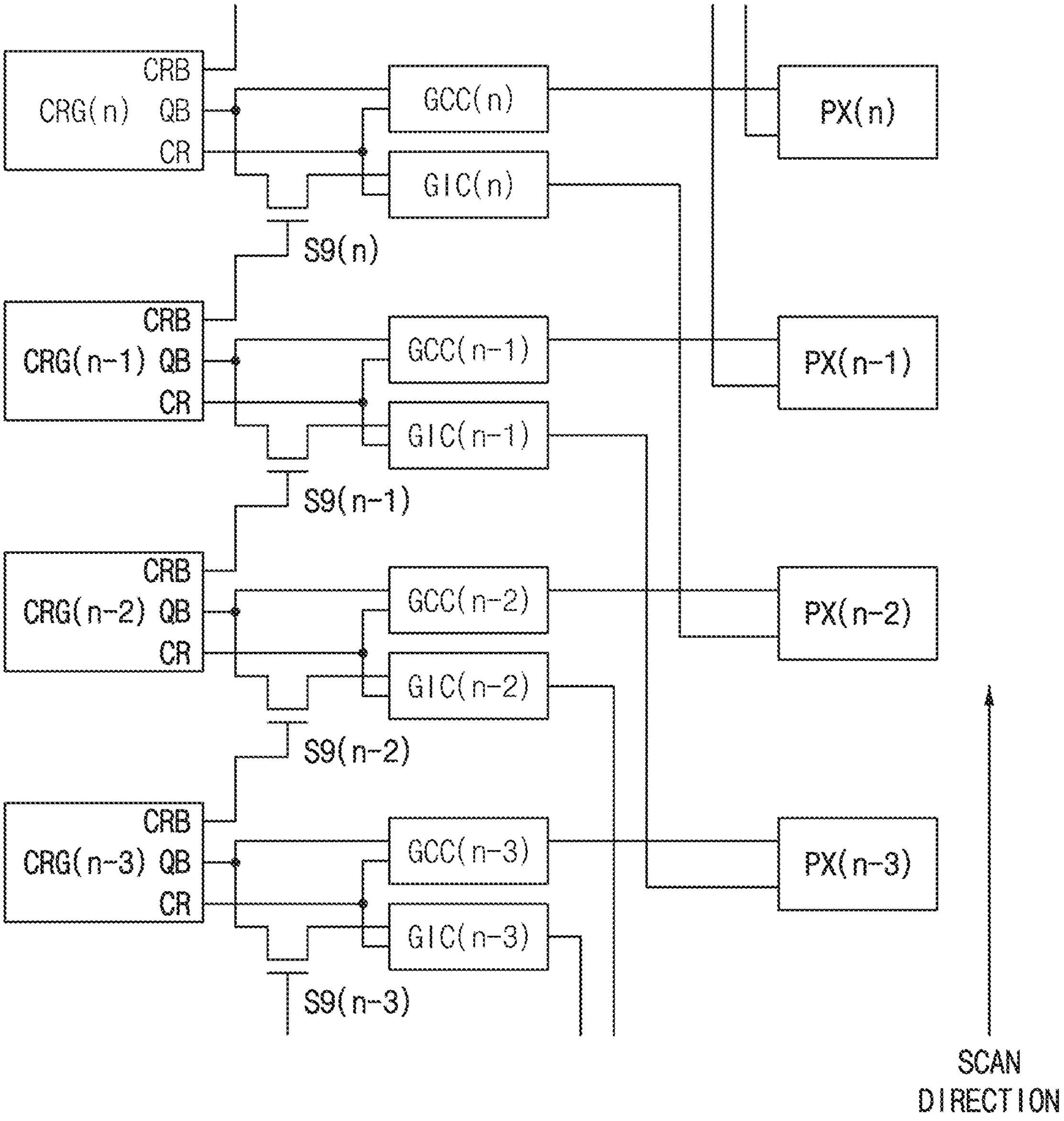
FIG. 16 is a block diagram illustrating examples of a carry generator, a first masking circuit and a second masking circuit of the gate driver of FIG. 1.

FIG. 16 is a block diagram illustrating examples of a carry generator CRG(n), a first masking circuit GIC(n) and a second masking circuit GCC(n) of the gate driver 300 of FIG. 1.

The gate signal masking circuit, the gate driver and the display apparatus according to the present embodiment is substantially the same as the gate signal masking circuit, the gate driver and the display apparatus of the previous embodiment explained referring to FIGS. 1 to 15 except for the connection control signal applied to the connection control switching element. Thus, the same reference numerals will be used to refer to the same or like parts as those described in the previous embodiment of FIGS. 1 to 15 and any repetitive explanation concerning the above elements will be omitted.

Referring to FIGS. 1 to 6 and 8 to 16, the display apparatus includes a display panel 100 and a display panel driver. The display panel driver includes a driving controller 200, a gate driver 300, a gamma reference voltage generator 400, a data driver 500 and an emission driver 600.

The gate driver 300 includes the carry generator CRG(n), the first masking circuit GIC(n) and the second masking circuit GCC(n).

The first masking circuit GIC(n) is connected to the carry generator CRG(n) and outputs a first gate signal GI(n). The second masking circuit GCC(n) is connected to the carry generator CRG(n) and outputs a second gate signal GC(n).

The first masking circuit GIC(n) includes a connection control switching element S9 connecting a first control node QB of the carry generator CRG(n) and a first switching element SI1 of the first masking circuit GIC(n) based on a connection control signal (e.g. CR(n−m)).

In contrast, the second masking circuit GCC(n) does not include a connection control switching element connecting the first control node QB of the carry generator CRG(n) and a ninth switching element SC1 of the second masking circuit GCC(n) based on the connection control signal (e.g. CR(n−m)).

For example, the first control node QB of the carry generator CRG(n) may be connected to the first switching element SI1 of the first masking circuit GIC(n) through the connection control switching element S9. In contrast, the first control node QB of the carry generator CRG(n) may be directly connected to the ninth switching element SC1 of the second masking circuit GCC(n).

For example, the connection control signal applied to a control electrode of the connection control switching element S9 may be an inverted signal of the carry signal CR(n−1) of the first previous stage as shown in FIG. 16. In addition, for example, the connection control switching element S9 may be an N-type transistor in FIG. 16.

The present invention may not be limited to the case of FIG. 16. The connection control signal applied to the control electrode of the connection control switching element S9 may be an inverted signal CRB(n−m) of one CR(n−m) of previous carry signals of previous stages.

According to the present embodiment, the output of the gate signal may be controlled based on the carry signal CR(n), the first enable signal EN and the second enable signal ENB so that the multiple division of the driving frequency may be supported. Through the multiple division of the driving frequency, the power consumption of the display apparatus may be effectively reduced.

In addition, when the first gate signal generator for generating the data initialization gate signal GI(n) and the second gate signal generator for generating the compensation gate signal GC(n) are formed in common, the first masking circuit GIC(n) for outputting the data initialization gate signal GI(n) further includes the control switching element S9 but the second masking circuit GCC(n) for outputting the compensation gate signal GC(n) does not further include the control switching element S9 so that the waveforms of the data initialization gate signal GI(n) and the compensation gate signal GC(n) may be generated differently. The data initialization gate signal GI(n) and the compensation gate signal GC(n) are generated differently so that the display quality of the display panel 100 may be enhanced.

Figure 17:
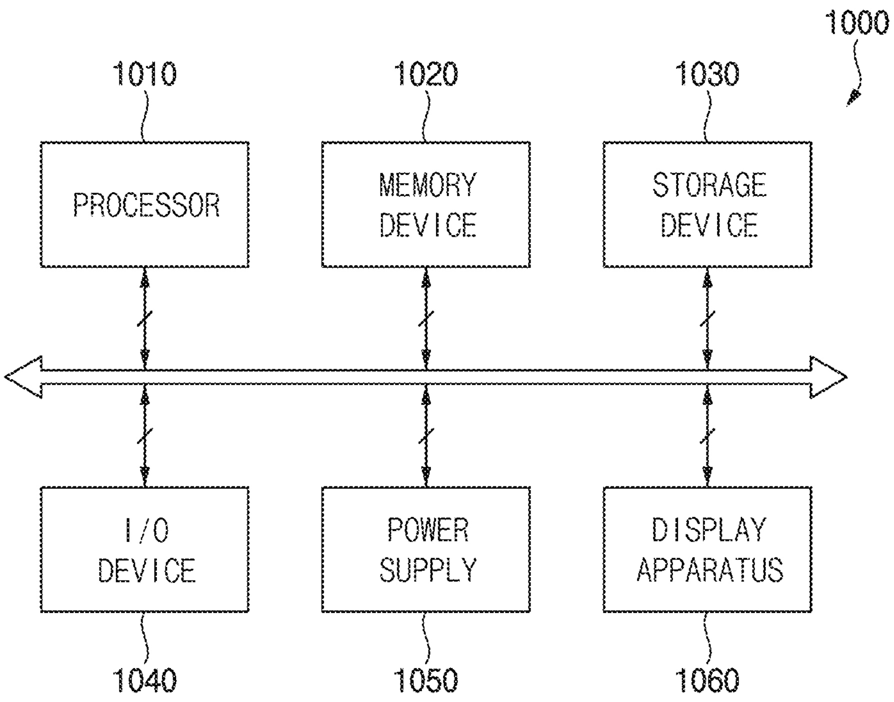
FIG. 17 is a block diagram illustrating an electronic apparatus according to an embodiment of the present invention.
Figure 18:
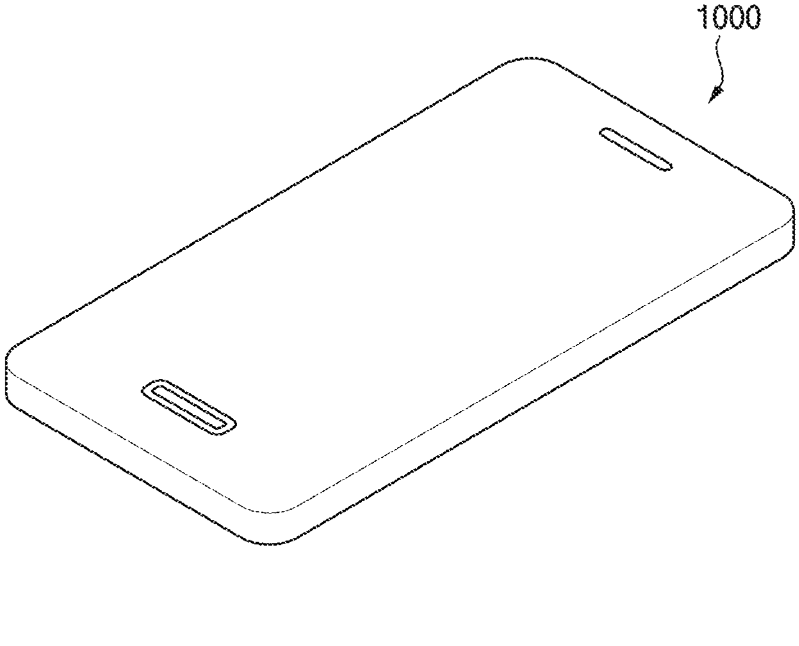
FIG. 18 is a diagram illustrating an example in which the electronic apparatus of FIG. 17 is implemented as a smart phone.

FIG. 17 is a block diagram illustrating an electronic apparatus according to an embodiment of the present invention. FIG. 18 is a diagram illustrating an example in which the electronic apparatus of FIG. 17 is implemented as a smart phone.

Referring to FIGS. 17 and 18, the electronic apparatus 1000 may include a processor 1010, a memory device 1020, a storage device 1030, an input/output ("I/O") device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus ("USB") device, other electronic apparatuses, etc.

In an embodiment, as illustrated in FIG. 18, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display ("HMD") device, and the like.

The processor 1010 may perform various computing functions or various tasks. The processor 1010 may be a micro-processor, a central processing unit ("CPU"), an application processor ("AP"), and the like. The processor 1010 may be coupled to other components via an address bus, a control bus, a data bus, etc. Further, the processor 1010 may be coupled to an extended bus such as a peripheral component interconnection ("PCI") bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and the like and/or at least one volatile memory device such as a dynamic random access memory ("DRAM") device, a static random access memory ("SRAM") device, a mobile DRAM device, and the like.

The storage device 1030 may include a solid state drive ("SSD") device, a hard disk drive ("HDD") device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the embodiments of the gate signal masking circuit, the gate driver and the display apparatus, the power consumption of the display apparatus may be reduced and the display quality may be enhanced.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A gate signal masking circuit comprising:

a connection control switching element configured to connect a first control node and a first switching element based on a connection control signal;

the first switching element including a control electrode connected to a masking control node, a first electrode connected to the connection control switching element and a second electrode connected to a second control node;

a second switching element including a control electrode configured to receive a carry signal, a first electrode configured to receive a masking power signal and a second electrode connected to a first intermediate node;

a third switching element including a control electrode configured to receive a first enable signal, a first electrode connected to the first intermediate node and a second electrode connected to the masking control node;

a fourth switching element including a control electrode configured to receive a second enable signal, a first electrode connected to the masking control node and a second electrode connected to a second intermediate node; and a fifth switching element including a control electrode configured to receive the carry signal, a first electrode connected to the second intermediate node and a second electrode configured to receive a low power voltage.

2. The gate signal masking circuit of claim 1, further comprising:

a sixth switching element including a control electrode connected to the second control node, a first electrode configured to receive a first clock signal and a second electrode connected to a gate output node;

a seventh switching element including a control electrode configured to receive the carry signal, a first electrode connected to the gate output node and a second electrode configured to receive the low power voltage; and an eighth switching element including a control electrode configured to receive the carry signal, a first electrode configured to receive the first clock signal and a second electrode connected to the second control node.

3. The gate signal masking circuit of claim 2, further comprising:

a first masking capacitor including a first electrode configured to receive the first clock signal and a second electrode connected to the second control node; and a second masking capacitor including a first electrode connected to the masking control node and a second electrode configured to receive the low power voltage.

4. The gate signal masking circuit of claim 2, wherein the masking power signal is the first clock signal, and wherein the first electrode of the second switching element is connected to the first electrode of the sixth switching element.

5. The gate signal masking circuit of claim 1, wherein when the first enable signal has an inactive level in all periods in which the carry signal has an active level, the gate signal masking circuit is configured to output a gate pulse.

6. The gate signal masking circuit of claim 1, wherein when the first enable signal has an active level in all periods in which the carry signal has an active level, the gate signal masking circuit is configured not to output a gate pulse.

7. The gate signal masking circuit of claim 1, wherein when the first enable signal is changed from an inactive level to an active level during a period in which the carry signal has an active level, the gate signal masking circuit is configured to output a gate pulse.

8. The gate signal masking circuit of claim 1, wherein when the first enable signal is changed from an active level to an inactive level during a period in which the carry signal has an active level, the gate signal masking circuit is configured not to output a gate pulse.

9. The gate signal masking circuit of claim 1, wherein the connection control signal is one of previous carry signals, and wherein the connection control switching element is a P-type transistor.

10. The gate signal masking circuit of claim 1, wherein the connection control signal is an inverted signal of one of previous carry signals, and wherein the connection control switching element is an N-type transistor.

11. A gate driver comprising:

a carry generator configured to generate a carry signal based on a previous carry signal;

a first masking circuit connected to the carry generator and configured to output a first gate signal; and a second masking circuit connected to the carry generator and configured to output a second gate signal, wherein the first masking circuit includes a connection control switching element configured to connect a first control node of the carry generator and a first switching element of the first masking circuit based on the previous carry signal, another previous carry signal, or an inverted signal of one of the previous carry signal and the another previous carry signal, which are applied to a control electrode of the connection control switching element, wherein the connection control switching element is a transistor.

12. The gate driver of claim 11, wherein the first control node of the carry generator is directly connected to a ninth switching element of the second masking circuit.

13. The gate driver of claim 11, wherein the first masking circuit comprises:

the first switching element including a control electrode connected to a first masking control node, a first electrode connected to the connecting control switching element and a second electrode connected to a second control node;

a second switching element including a control electrode configured to receive the carry signal, a first electrode configured to receive a masking power signal and a second electrode connected to a first intermediate node;

a third switching element including a control electrode configured to receive a first enable signal, a first electrode connected to the first intermediate node and a second electrode connected to the first masking control node;

a fourth switching element including a control electrode configured to receive a second enable signal, a first electrode connected to the first masking control node and a second electrode connected to a second intermediate node;

a fifth switching element including a control electrode configured to receive the carry signal, a first electrode connected to the second intermediate node and a second electrode configured to receive a low power voltage;

a sixth switching element including a control electrode connected to the second control node, a first electrode configured to receive a first clock signal and a second electrode connected to a first gate output node;

a seventh switching element including a control electrode configured to receive the carry signal, a first electrode connected to the first gate output node and a second electrode configured to receive the low power voltage; and an eighth switching element including a control electrode configured to receive the carry signal, a first electrode configured to receive the first clock signal and a second electrode connected to the second control node.

14. The gate driver of claim 13, wherein the second masking circuit comprises:

a ninth switching element including a control electrode connected to a second masking control node, a first electrode connected to the first control node and a second electrode connected to a third control node;

a tenth switching element including a control electrode configured to receive the carry signal, a first electrode configured to receive the masking power signal and a second electrode connected to a third intermediate node;

an eleventh switching element including a control electrode configured to receive the first enable signal, a first electrode connected to the third intermediate node and a second electrode connected to the second masking control node;

a twelfth switching element including a control electrode configured to receive the second enable signal, a first electrode connected to the second masking control node and a second electrode connected to a fourth intermediate node;

a thirteenth switching element including a control electrode configured to receive the carry signal, a first electrode connected to the fourth intermediate node and a second electrode configured to receive the low power voltage;

a fourteenth switching element including a control electrode connected to the third control node, a first electrode configured to receive the first clock signal and a second electrode connected to a second gate output node;

a fifteenth switching element including a control electrode configured to receive the carry signal, a first electrode connected to the second gate output node and a second electrode configured to receive the low power voltage; and a sixteenth switching element including a control electrode configured to receive the carry signal, a first electrode configured to receive the first clock signal and a second electrode connected to the third control node.

15. The gate driver of claim 11, wherein the carry generator comprises:

a first carry switching element including a control electrode configured to receive a second carry clock signal, a first electrode configured to receive the previous carry signal and a second electrode connected to a first carry node;

a second carry switching element including a first control electrode configured to receive a first carry clock signal, a first electrode configured to receive the previous carry signal and a second electrode connected to the first carry node;

a fourth carry switching element including a control electrode connected to the first carry node, a first electrode configured to receive a high power voltage and a second electrode connected to a second carry node;

a fifth carry switching element including a first control electrode connected to the first carry node, a first electrode configured to receive a low power voltage and a second electrode connected to the second carry node;

a seventh carry switching element including a control electrode connected to the second carry node, a first electrode configured to receive the high power voltage and a second electrode connected to a carry output node; and an eighth carry switching element including a first control electrode connected to the second carry node, a first electrode configured to receive the low power voltage and a second electrode connected to the carry output node.

16. The gate driver of claim 15, wherein the carry generator further comprises:

a third carry switching element including a control electrode connected to a ground, a first electrode connected to the ground and a second electrode connected to a second control electrode of the second carry switching element;

a sixth carry switching element including a control electrode connected to the ground, a first electrode connected to the ground and a second electrode connected to a second control electrode of the fifth carry switching element; and a ninth carry switching element including a control electrode connected to the ground, a first electrode connected to the ground and a second electrode connected to a second control electrode of the eighth carry switching element.

17. The gate driver of claim 11, wherein the first gate signal is configured to output a single pulse in a frame, and wherein the second gate signal is configured to output two pulses in the frame.

18. A display apparatus comprising:

a display panel including a pixel including a switching element of a first type and a switching element of a second type different from the first type;

a gate driver configured to output a first gate signal and a second gate signal to the display panel; and a data driver configured to output a data voltage to the display panel, wherein the gate driver comprises:

a carry generator configured to generate a carry signal based on a previous carry signal;

a first masking circuit connected to the carry generator and configured to output the first gate signal; and a second masking circuit connected to the carry generator and configured to output the second gate signal, wherein the first masking circuit includes a connection control switching element configured to connect a first control node of the carry generator and a first switching element of the first masking circuit based on the previous carry signal, another previous carry signal, or an inverted signal of one of the previous carry signal and the another previous carry signal, which are applied to a control electrode of the connection control switching element, wherein the connection control switching element is a transistor.

19. The display apparatus of claim 18, wherein the first control node of the carry generator is directly connected to a ninth switching element of the second masking circuit.

20. The display apparatus of claim 18, wherein the pixel comprises:

a first pixel switching element including a control electrode connected to a first pixel node, a first electrode connected to a second pixel node and a second electrode connected to a third pixel node;

a second pixel switching element including a control electrode configured to receive a data writing gate signal, a first electrode configured to receive the data voltage and a second electrode connected to the second pixel node;

a third pixel switching element including a control electrode configured to receive a compensation gate signal, a first electrode connected to the first pixel node and a second electrode connected to the third pixel node;

a fourth pixel switching element including a control electrode configured to receive a data initialization gate signal, a first electrode configured to receive an initialization voltage and a second electrode connected to the first pixel node;

a fifth pixel switching element including a control electrode configured to receive an emission signal, a first electrode configured to receive a pixel high power voltage and a second electrode connected to the second pixel node;

a sixth pixel switching element including a control electrode configured to receive the emission signal, a first electrode connected to the third pixel node and a second electrode connected to an anode electrode of a light emitting element;

a seventh pixel switching element including a control electrode configured to receive a light emitting element initialization gate signal, a first electrode configured to receive a light emitting element initialization voltage and a second electrode connected to the anode electrode of the light emitting element; and the light emitting element including the anode electrode and a cathode electrode configured to receive a pixel low power voltage, wherein a waveform of the first gate signal outputted from the first masking circuit is different from a waveform of the second gate signal outputted from the second masking circuit, wherein the first gate signal is the data initialization gate signal, and wherein the second gate signal is the compensation gate signal.

21. The display apparatus of claim 18, wherein the pixel comprises:

a first pixel switching element including a control electrode connected to a first pixel node, a first electrode connected to a second pixel node and a second electrode connected to a third pixel node;

a second pixel switching element including a control electrode configured to receive a data writing gate signal, a first electrode configured to receive the data voltage and a second electrode connected to the second pixel node;

a third pixel switching element including a control electrode configured to receive a compensation gate signal, a first electrode connected to the first pixel node and a second electrode connected to the third pixel node;

a fourth pixel switching element including a control electrode configured to receive a data initialization gate signal, a first electrode configured to receive an initialization voltage and a second electrode connected to the first pixel node;

a fifth pixel switching element including a control electrode configured to receive an emission signal, a first electrode configured to receive a pixel high power voltage and a second electrode connected to the second pixel node;

a sixth pixel switching element including a control electrode configured to receive the emission signal, a first electrode connected to the third pixel node and a second electrode connected to an anode electrode of a light emitting element;

a seventh pixel switching element including a control electrode configured to receive a light emitting element initialization gate signal, a first electrode configured to receive a light emitting element initialization voltage and a second electrode connected to the anode electrode of the light emitting element; and the light emitting element including the anode electrode and a cathode electrode configured to receive a pixel low power voltage, wherein the light emitting element initialization gate signal is a data writing gate signal of a previous stage, wherein a waveform of the first gate signal outputted from the first masking circuit is different from a waveform of the second gate signal outputted from the second masking circuit, wherein the first gate signal is the data initialization gate signal, and wherein the second gate signal is the compensation gate signal.

22. The display apparatus of claim 18, wherein the pixel comprises:

a first pixel switching element including a control electrode connected to a first pixel node, a first electrode connected to a second pixel node and a second electrode connected to a third pixel node;

a second pixel switching element including a control electrode configured to receive a data writing gate signal, a first electrode configured to receive the data voltage and a second electrode connected to the second pixel node;

a third pixel switching element including a control electrode configured to receive a compensation gate signal, a first electrode connected to the first pixel node and a second electrode connected to the third pixel node;

a fourth pixel switching element including a control electrode configured to receive a data initialization gate signal, a first electrode configured to receive an initialization voltage and a second electrode connected to the first pixel node;

a fifth pixel switching element including a control electrode configured to receive an emission signal, a first electrode configured to receive a pixel high power voltage and a second electrode connected to the second pixel node;

a sixth pixel switching element including a control electrode configured to receive the emission signal, a first electrode connected to the third pixel node and a second electrode connected to an anode electrode of a light emitting element;

a seventh pixel switching element including a control electrode configured to receive a light emitting element initialization gate signal, a first electrode configured to receive a light emitting element initialization voltage and a second electrode connected to the anode electrode of the light emitting element;

an eighth pixel switching element including a control electrode configured to receive a bias gate signal, a first electrode configured to receive a bias voltage and a second electrode connected to the second pixel node; and the light emitting element including the anode electrode and a cathode electrode configured to receive a pixel low power voltage, wherein a waveform of the first gate signal outputted from the first masking circuit is different from a waveform of the second gate signal outputted from the second masking circuit, wherein the first gate signal is the data initialization gate signal, and wherein the second gate signal is the compensation gate signal.

* * * * *